United States Patent [19]
Ott et al.

[11] Patent Number: 5,254,194
[45] Date of Patent: Oct. 19, 1993

[54] COATED ABRASIVE SHEET MATERIAL WITH LOOP MATERIAL FOR ATTACHMENT INCORPORATED THEREIN

[75] Inventors: Ronald L. Ott, Lake Elmo; Michael R. Gorman, White Bear Lake; Dennis L. Becker, Vadnais Heights; Donald W. Folske, Oakdale; William L. Melbye, Minneapolis; Susan K. Nestegard, Woodbury; David E. Slama, Vadnais Heights; John L. Barry, North St. Paul; Jeffrey R. McMahon, Woodbury, all of Minn.

[73] Assignee: Minnesota Mining and Manufacturing Company, St. Paul, Minn.

[21] Appl. No.: 748,038

[22] Filed: Aug. 21, 1991

Related U.S. Application Data

[63] Continuation-in-part of Ser. No. 555,049, Jul. 18, 1990, which is a continuation-in-part of Ser. No. 517,409, Apr. 27, 1990, abandoned, which is a continuation of Ser. No. 193,832, May 13, 1988, abandoned.

[51] Int. Cl.⁵ .................................................. B32B 31/08
[52] U.S. Cl. ........................................ 156/176; 156/178; 156/201; 156/244.11; 156/244.11; 156/244.23; 156/244.24; 156/244.25; 156/279; 156/470; 156/471; 156/472; 51/293; 51/295; 51/297; 51/383; 51/400; 51/401; 51/406; 51/407
[58] Field of Search ............ 156/72, 176, 178, 201, 156/205, 210, 200, 244.11, 244.16, 244.23, 244.24, 244.25, 279, 66, 244.15, 470, 471, 472; 264/286; 24/445, 446, 447, 449, 451, 452; 51/293, 295, 297, 298, 383, 400, 401, 404, 406, 407

[56] References Cited

U.S. PATENT DOCUMENTS

| | | | |
|---|---|---|---|
| 2,639,250 | 5/1953 | Reinhardt | 154/78 |
| 2,918,762 | 12/1959 | Hurst | 51/407 |
| 3,142,604 | 7/1964 | Mills et al. | 154/435 |
| 3,142,611 | 7/1964 | Mills | 256/72 |
| 3,182,346 | 5/1965 | Winston | 156/244.25 |
| 3,345,688 | 10/1967 | Billarant | 156/436 |
| 3,382,122 | 5/1968 | Nalle, Jr. | 156/244.25 |
| 3,533,871 | 10/1970 | Zentmyer | 156/205 |
| 3,562,044 | 2/1971 | Erb | 156/176 |
| 3,621,764 | 11/1971 | Muller et al. | 156/205 |
| 3,676,242 | 7/1972 | Prentice | 156/178 |
| 3,694,867 | 10/1972 | Stumpf | 24/204 |
| 3,703,739 | 11/1972 | Young et al. | 51/406 |
| 3,708,384 | 1/1973 | Carpenter | 161/65 |
| 3,723,213 | 3/1973 | Hoey | 156/178 |
| 3,733,226 | 5/1973 | Stoller | 156/72 |
| 3,862,872 | 1/1975 | Hoey | 156/435 |
| 3,869,764 | 3/1975 | Tanaka et al. | 24/204 |
| 3,893,879 | 7/1975 | Ito et al. | 156/201 |
| 3,913,183 | 10/1975 | Brumilk | 24/204 |
| 3,955,246 | 5/1976 | Tanaka | 24/204 |
| 3,959,051 | 5/9176 | Schirmer | 156/85 |
| 3,982,978 | 9/1976 | Carpenter | 156/72 |
| 4,169,303 | 10/1979 | Lemelson | 24/204 |
| 4,263,755 | 4/1981 | Globus | 51/297 |
| 4,437,269 | 3/1984 | Shaw | 53/358 |
| 4,477,938 | 10/1984 | Rogut | 51/401 |
| 4,592,943 | 1/1986 | Cascian et al. | 428/171 |
| 4,609,581 | 9/1986 | Ott | 428/100 |
| 4,614,220 | 9/1986 | Savage | 156/244.11 |
| 4,617,022 | 10/1986 | Pigneul et al. | 604/391 |
| 4,617,767 | 10/1986 | Ali | 51/406 |
| 4,686,136 | 8/1987 | Homonoff et al. | 428/286 |
| 4,734,298 | 3/1988 | Kikukawa | 427/256 |
| 4,759,816 | 7/1988 | Kasper et al. | 156/244.11 |
| 4,761,318 | 8/1988 | Ott et al. | 156/244.11 |
| 4,784,919 | 11/1988 | Tokuno et al. | 428/500 |

FOREIGN PATENT DOCUMENTS

| | | |
|---|---|---|
| 0142338 | 5/1985 | European Pat. Off. . |
| 0223075 | 5/1987 | European Pat. Off. . |
| 0289198 | 2/1988 | European Pat. Off. . |
| 0325473 | 7/1989 | European Pat. Off. . |
| 3903204 | 2/1990 | Fed. Rep. of Germany . |
| 56-152584 | 11/1981 | Japan . |
| 2168653A | 6/1986 | United Kingdom . |

*Primary Examiner*—Caleb Weston
*Attorney, Agent, or Firm*—Gary L. Griswold; Walter N. Kirn; William L. Huebsch

[57] ABSTRACT

A sheet of coated abrasive material including a backing having abrasive on one surface and loops projecting from its other surface by which the sheet of coated abrasive material can be held by hooks on the support surface of a pad. The backing comprises a polymeric bonding layer defining its rear surface. The sheet of coated abrasive material comprises a nonwoven sheet of longitudinally oriented fibers having anchor portions bonded in the polymeric bonding layer at spaced bonding locations, and arcuate portions projecting from the rear surface of the backing between the bonding locations to provide the loops.

24 Claims, 8 Drawing Sheets

COATED ABRASIVE SHEET MATERIAL WITH LOOP MATERIAL FOR ATTACHMENT INCORPORATED THEREIN

CROSS REFERENCE TO RELATED APPLICATIONS

This application is a continuation in part of U.S. patent application No. 07/555,049 filed Jul. 18, 1990 which is a continuation in part of U.S. patent application No. 07/517,409 filed Apr. 27, 1990, abandoned, which is a continuation of U.S. patent application No. 07/193,832 filed May 13, 1988, now abandoned. The content of patent applications 07/555,049, 07/517,409 and 07/193,832 are incorporated herein by reference.

TECHNICAL FIELD

The present invention relates to coated abrasive sheet material comprising a layer of abrasive grains adhered to a front surface of a backing and a multiplicity of loops projecting from a rear surface of the backing by which loops the sheet material is adapted to be held on hooks along the support surface of a pad while the sheet is driven by the pad to abrade a workpiece.

BACKGROUND OF THE INVENTION

U.S. Pat. Nos. 4,437,269, 4,609,581 and 4,761,318 describe coated abrasive sheet materials each comprising a layer of abrasive grains adhered to a front surface of a backing and a multiplicity of loops projecting from a rear surface of the backing by which loops the sheet material is adapted to be releasably held on hooks along the support surface of a pad while the sheet is driven by the pad to abrade a workpiece. The loop materials incorporated in such abrasive sheet material typically comprise a backing portion and a multiplicity of loops formed predominately from longitudinally oriented polymeric fibers anchored in the backing portion and projecting from the backing portion so that they may be releasably engaged with the hooks along the support surface of the pad. Those loop materials are made by different methods including weaving, knitting, or stitching techniques. While such loop materials when incorporated in abrasive sheet material work well to attach the abrasive sheet material along the support surface of the pad, the processes by which the sheets of loop material are made are more expensive than may be desired, particularly because typical abrasive sheet material is used for a relatively short period of time before it is worn out and discarded.

DISCLOSURE OF INVENTION

The present invention provides a coated abrasive sheet material comprising a layer of abrasive grains adhered to a front surface of a backing and a multiplicity of loops projecting from a rear surface of the backing, which sheet material is adapted to be held on the support surface of a pad from which project a multiplicity of hooks by releasable engagement between the loops and the hooks while the coated abrasive sheet material is driven by the pad to abrade a workpiece, and a method for making coated abrasive sheet material. The coated abrasive sheet material and method according to the present invention provide effective loop fastener portions for such coated abrasive sheet material that are inexpensive to manufacture and attach to the backing.

In the coated abrasive sheet material according to the present invention the backing comprises a polymeric bonding layer defining at least a portion of the rear surface of the backing, and the coated abrasive sheet material includes a sheet of longitudinally oriented fibers having anchor portions (which are preferably nondeformed) bonded in the polymeric bonding layer at spaced bonding locations and arcuate portions projecting from the rear surface of the backing between the bonding locations to provide the loops. The polymeric bonding layer can be continuous, or, when the backing includes layers other than the polymeric bonding, can be discontinuous (e.g., a pattern of adhesive with adhesive positioned only at the spaced bonding locations).

The loop portions formed by the sheet of fibers are intended for limited use to fasten the abrasive sheet material to the support surface of the pad (i.e., one piece of abrasive sheet material will typically be attached to the support surface only one to five times with a piece of abrasive sheet material having a coarser grade of abrasive typically being removed and reattached more often than a piece of abrasive sheet material having a finer grade of abrasive, and one piece of abrasive sheet material will seldom be removed and reattached as much as 10 times). The loops on the abrasive sheet material should be easy to engage with the hooks along the support surface by pressing the abrasive sheet material and the support surface together. Such engagement of the hooks and loops is easy if the loops project a good distance above the rear surface of the backing regardless of the open area between the loops. If the distance the loops project above the backing is limited (i.e. to less than about 2.54 millimeter or 0.1 inch) to lessen the cost of the sheet of fibers included in the abrasive sheet material, however, easy engagement of the hooks with the loops is facilitated by a relatively high percentage of open area between the loops measured in a plane parallel to the backing. That engagement between the hooks and the loops must afford sufficient transfer of driving force from the pad to the abrasive sheet material along the plane of its rear surface to drive the abrasive sheet material so that it will abrade a workpiece, and must simultaneously hold the abrasive on the support surface of the pad to prevent the abrasive sheet material from flying off of the support surface during that abrading process. The engagement needed between the hooks and the loops to perform this driving function is measured as a shear force in the plane of the backing. Also, it should be relatively easy to peel the loops on the abrasive disc from the hooks along the support surface to separate the loops from those hooks after the abrading process is completed without breaking a large percentage of the fibers or of the bonds between the fibers and the backing, which ease of peeling is measured as a peel force.

An open area in the range of 50 to 90 percent, more preferably in the range of 60 to 80 percent, and preferably about 70 percent has been found to afford easy movement of loops that can project about 2.54 millimeters or 0.1 inch over hooks projecting from the support surface of the type commercially designated "Type 1H2" which are commercially available from Kanebo BLT, Osaka, Japan. Such hooks project about 1.4 millimeters (0.055 inch) from the support surface, have single stems with diameters of about 0.238 millimeter (0.009 inch) and lengths of about 1.15 millimeters (0.045 inch), have generally semi-spherical heads with maximum diameters of about 0.594 millimeter (0.023 inch), and are disposed in a square array spaced about 0.86 millimeter (0.034 inch) apart so that at their maximum diameters the heads occupy about 60 to 75 percent of the plane parallel to the support surface to which they are attached. Also, an open area in the range of 60 to 95 percent, more preferably in the range of 70 to 90 percent, and preferably about 85 percent has been found to afford easy movement of such loops over hooks projecting from the support surface of the type commercially designated "Kletto" brand hooks or fastening systems which are commercially available from Gettlieb Binder Gmbh & Co., Holzgerlingen, Germany. Such hooks project about 0.456 millimeter (0.018 inch) from the support surface, have single stems with diameters of about 0.169 millimeter (0.007 inch) and lengths of about 0.208 millimeter (0.008 inch), have generally semi-spherical heads with maximum diameters of about 0.435 millimeter (0.017 inch), and are disposed in a square array spaced about 0.75 millimeter (0.03 inch) apart so that at their maximum diameters the heads occupy about 60 to 70 percent of the plane parallel to the support surface to which they are attached.

A shear force (i.e., a shear force measured in accordance with a shear force test method described at the end of Example 1 in this application) between the loops and the hooks in the range of 716 to 1430 grams per linear centimeter (4 to 8 pounds per linear inch) has been found adequate to drive abrasive sheet material coated with the finer grades of abrasive (i.e., 80 to 400) whereas a shear force between the loops and the hooks in a similar range having slightly higher and lower limits has been found adequate to drive abrasive sheet material coated with the coarser grades of abrasive (i.e., below 80) which generally require larger driving forces than the finer grades of abrasive; with a preferred shear force being about 1430 grams per linear centimeter (8 pounds per linear inch) for finer grades of abrasive, and being slightly higher for coarser grades of abrasive.

A 90 degree peel force (i.e., a peel force measured in accordance with a 90 degree peel test method described at the end of Example 1 in this application) between the loops and the hooks of less than about 357 grams per linear centimeter (2 pounds per linear inch) facilitates removal of the abrasive sheet material after use, with a preferred peel force between the loops and the hooks that facilitates easy removal of the abrasive sheet material after use being about 50 grams per linear centimeter (0.28 pounds per linear inch).

The shear and peel forces that can be developed by loops on abrasive sheet material according to the present invention are dependent on (1) the tensile strength of the fibers from which the loops are made which is a function of the material, cross sectional area and type of fibers, (2) the density, size, orientation and spacing of the loops, and (3) the strength of the bonds between the fibers and the backing.

Different fiber materials provide different tensile strengths at the same fiber diameters. The fiber material selected should be that which provides the needed shear and peel properties for the loop, while not being too small or too large in diameter so that it will provide the needed open area between the loops, and not having other undesirable properties such as a low melting point which could allow the heat of abrading friction to destroy the loops. Suitable fiber materials include polyester, polypropylene, polyethylene, polyamide resins and bi-component combinations of any two of those materials.

To provide the engagement needed with the mushroom headed "Type 1H2" hooks described above which are commercially available from Kanebo BLT (which are preferred hooks for use along the support surface of the pad) preferably the arcuate portions of the sheet of fibers that form the loops when projecting to their maximum heights from the rear surface have heights from the backing of less than about 6.4 millimeters (0.250 inch) and preferably project in the range of about 0.5 millimeters (0.02 inch) to 3 millimeters (0.12 inch) with 2 millimeters (0.08 inch) being the maximum preferred height for loops on sheets of coated abrasive material that are to be stacked or rolled so that the heights or diameters of the stacked or rolled sheets are minimized. Lower heights for the loops may be possible by using stronger fibers and/or greater loop density. The bonding locations should be quite narrow (e.g., 0.1 centimeter or 0.04 inch wide) and should be spaced apart to provide in the range of about 2 to 6 bonding locations per centimeter (5 to 15 bonding locations per inch) and preferably about 2.4 to 4.7 bonding locations per centimeter (6 to 12 bonding locations per inch) measured in a direction at a right angle to the lengths of the bonding locations. The individual fibers in the sheet of fibers should have diameters in the range of about 0.03 to 0.07 millimeter (0.0012 to 0.0027 inch) which range is about 4 to 35 denier for polypropylene fibers, with fibers in the range of 0.038 to 0.056 millimeter (0.0015 to 0.0022 inch) or 9 to 20 denier for polypropylene fibers being preferred. When polypropylene fibers are used the sheet of fibers without the backing should have a basis weight measured along the rear surface in the range of about 15 to 70 grams per square meter, more preferably in the range of about 25 to 50 grams per square meter, and preferably about 35 grams per square meter for 15 denier polypropylene fibers, to provide sufficient open area between the individual fibers in the sheet of fibers along the arcuate portions that form the loops (i.e., preferably between 50 and 90 percent open area) to afford easy movement of the hooks through and into engagement with the arcuate portions of the sheet of fibers whether the loops are projecting from the rear surface or lying along the rear surface, while providing sufficient fibers with sufficient strength to afford releasable engagement of the hooks with the fibers forming the loops to hold the sheet of coated abrasive material along the support surface of the pad and to drive the sheet of coated abrasive material from the pad to abrade a substrate in a direction generally parallel to the support surface of the pad. While the loops typically project at about a right angle from the rear surface of the backing when the sheet of coated abrasive material is first made, stacking or rolling sheets of the abrasive material together can cause crushing of the loops so that they lay along or parallel to the rear surface, and thus it is important that the loops afford such releasable engagement of the hooks with the fibers forming the loops when the loops are laying along the rear surface.

The coated abrasive sheet material according to the present invention is made by forming a sheet of fibers to have arcuate portions projecting in the same direction from spaced anchor portions of the sheet of fibers, providing a layer of liquid polymeric bonding material, immersing the anchor portions of the sheet of fibers in the layer of liquid polymeric bonding material, solidifying the layer of polymeric bonding material to form at least a portion of the backing around the spaced anchor portions of the sheet of fibers with the arcuate portions of the sheet of fibers projecting from the rear surface of the backing, and adhering a layer of abrasive grains to a front surface of the backing with a layer of bonding resin.

Such forming of the backing around the anchor portions of the sheet of fibers provides the advantage that the fibers in the anchor portions are generally non-deformed (even though the outer fibers in the anchor portions may be slightly flattened) and thus the individual fibers retain most of their initial strength adjacent the bonding location, while with the proper combination of materials the surface of the fibers can be fused to the backing material to firmly anchor the fibers in the backing; and the resultant polymeric bonding layer in which the fibers are bonded has generally uniform morphology throughout (even though the morphology of the backing may be slightly altered around the anchor portions of the sheet of fiber due to their effect as a heat sink). The polymeric bonding material coated or extruded onto the anchor portions of the sheet of fibers can be of the type called thermoplastic (e.g., polyethylene, polypropylene, polyester, or polyamide; that melts when it is heated and solidifies as it cools; or can be of the type called reactive hot melts that melts when it is heated, partially solidifies as it cools, and then cross-links as a result of a catalyst that has been added or exposure to an external element such as atmospheric moisture or ultraviolet radiation; or can be a liquid polymeric resin that is cured by adding an initiator or catalyst.

The method can also include positioning a surface of a sheet of backing material intended to be incorporated into the backing adjacent the spaced anchor portions of the sheet of fibers, forming or extruding a layer of the liquid polymeric bonding material on the anchor portions, or on the adjacent surface of the sheet of backing material, or on both; and pressing the sheet of backing material and the anchor portions of the fibers together to cause immersing of the anchor portions of the fibers in the liquid polymeric bonding and adhesion of the anchor portions of the fibers to the sheet of backing material when the polymeric bonding material cools. The layer of abrasive grains can be adhered to one surface of the sheet of backing material either before or after the layer of fibers is adhered to its other surface by the bonding material.

Alternatively, the liquid polymeric bonding material can form either the entire backing, or a backing layer that can later be incorporated in the backing by laminating it to another backing layer such as a backing layer to which a layer of abrasive grains is already adhered. For that purpose, the layer of liquid polymeric bonding material can be formed or extruded onto either or both of the anchor portions or a surface (such as that of a roller) adjacent the anchor portions that forms the surface of the backing opposite the sheet of fibers; or onto either or both of the anchor portions of the fibers or an adjacent surface of a sheet of support material intended to shape or retain the shape of the backing as it cures, which sheet of support material can later be stripped away. The layer of abrasive grains or the backing layer to which the layer of abrasive grains is already adhered can then be adhered or laminated to the surface of the backing opposite the layer of fibers.

The individual longitudinally oriented fibers may be of many polymeric materials such as polypropylene, polyethylene, polyester, nylon or polyamide, or combinations of such materials such as a core of polyester and a sheath of polypropylene which provides relatively high strength due to its core material and is easily bonded due to its sheath material. Fibers of one material or fibers of different materials or material combinations may be used in the same sheet of fibers.

The sheet of fibers incorporated in the coated abrasive sheet material can be a nonwoven sheet of chopped fibers, or can be a sheet of continuous filaments which can be aligned in one direction along the sheet or disposed in a nonwoven configuration. When the sheet of fibers is a nonwoven sheet the fibers cross and contact each other and can be entirely randomly disposed, or can have a majority of the fibers extending in a first direction along the sheet. The sheet of fibers can be formed so that the anchor portions of the sheet of fibers are parallel and, when the fibers are at least partially aligned, elongate in a direction along the sheet of fibers that is at a right angle to the first direction in which the majority of the fibers extend along the sheet. This can be done by providing a pair of corrugating members or rollers each including a plurality of circumferentially spaced generally axially extending ridges around and defining its periphery, with the ridges having outer surfaces and defining spaces between the ridges adapted to receive portions of the ridges of the other corrugating member in meshing relationship with the sheet of fibers between the meshed ridges and to afford rolling engagement between the ridges and spaces of the corrugating members in the manner of gear teeth. The corrugating members are rotated; and the sheet of fibers is fed between the meshed portions of the ridges of the corrugating members to generally conform the sheet of fibers to the periphery of one of the corrugating members and form the arcuate portions of the sheet of fibers in the spaces between the ridges of that one corrugating member and the generally parallel anchor portions of the sheet of fibers along the outer surfaces of the ridges on that one corrugating member. The formed sheet of fibers can be retained along the periphery of that one corrugating member after it has moved past the meshed portions of the ridges, and the liquid polymeric bonding material can be deposited or extruded onto the anchor portions of the sheet of fibers on the end surfaces of the ridges on that one first corrugating member to form the backing.

Alternatively, when at least a majority of the fibers are oriented in a first direction along the sheet of fibers the sheet can first be formed so that a first set of anchor portions of the sheet of fibers are parallel and elongate in a direction along the sheet that is parallel to the first direction in which the majority of the fibers are oriented, that first set of anchor portions can be immersed in the liquid polymeric bonding material, and subsequently the sheet can be formed with a second set of anchor portions transverse to the first set and the first direction that are embedded in the polymeric bonding material and, after the polymeric bonding material solidifies, provide the majority of the bonds between the projecting portions of the fibers and the backing. This alternate approach provides a processing advantage in that the sheet of fibers is more easily conformed to the periphery of a corrugating member by being expanded in its transverse direction which requires only separation of the fibers in the sheet in a transverse direction rather than by being gathered in its longitudinal direction. The sheet of fibers can be formed to provide the anchor and arcuate portions by providing a corrugating member including a plurality of spaced parallel ridges defining its periphery, feeding the sheet of fibers longitudinally along the periphery of the corrugating member in a direction parallel to the ridges to generally conform the sheet of fibers to its periphery, thereby forming the arcuate portions of the sheet of fibers in spaces between the ridges of the corrugating member and the anchor portions of the sheet of fibers along the ridges of the first corrugating member, and immersing the anchor portions of the sheet of fibers along the ridges in the liquid polymeric bonding material. This method can be performed by using fixed or rotatable corrugating members.

Using interlocking corrugating members with appropriately shaped interacting portions such as various shaped posts and sockets, the sheet of fibers can also be formed so that the anchor portions of the sheet of fibers are in the shapes of interlocking closed patterns (e.g., circles, diamonds, rectangles, octagons, letters or numbers which could provide a trademark, etc.) with loops projecting from the backing between those anchor portions.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
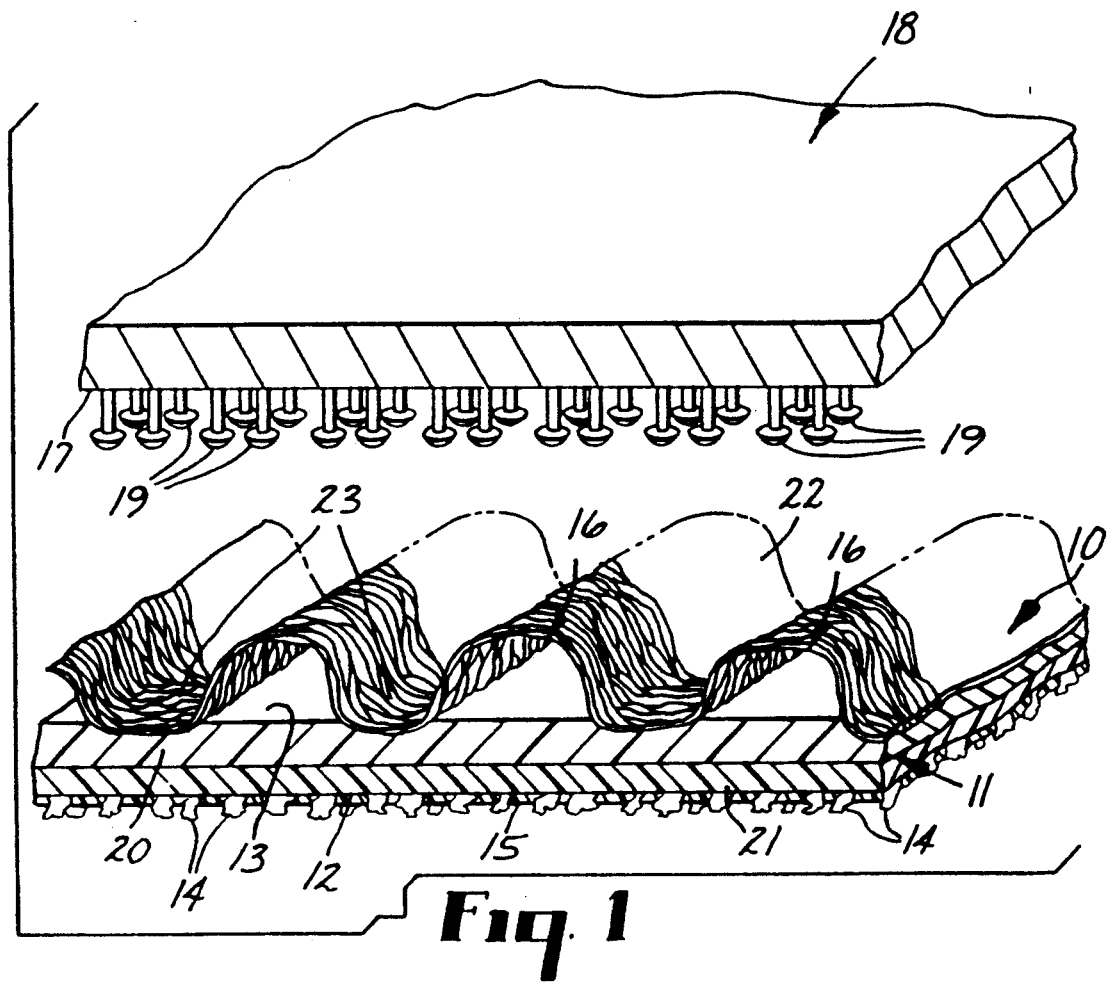
FIG. 1 is a fragmentary perspective sectional view of a first embodiment of a sheet of coated abrasive material according to the present invention together with a fragmentary perspective sectional view of a pad to which the sheet of coated abrasive material may be releasably attached.
Figure 2:
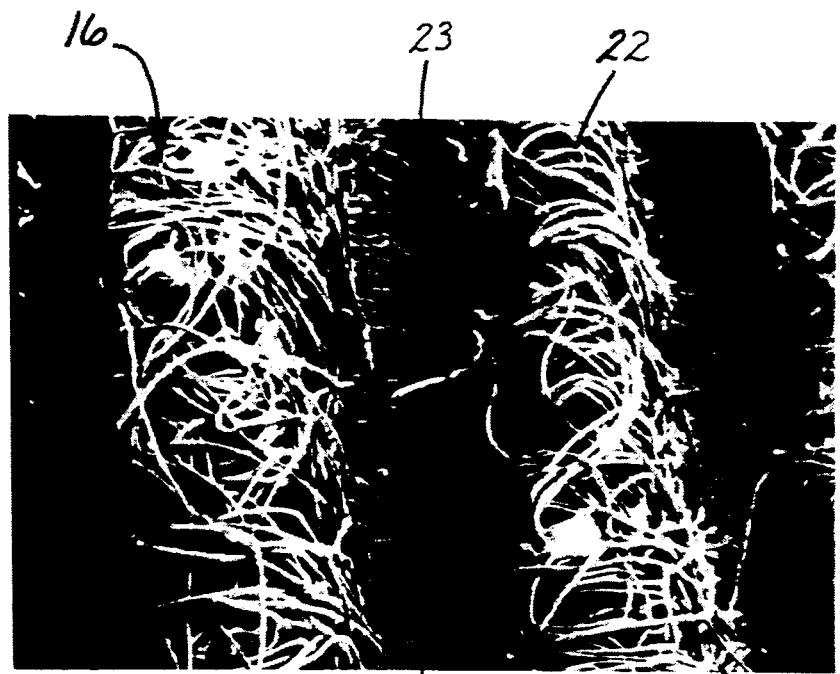
FIG. 2 is a photograph at 15× magnification of a sheet of fibers included in the sheet of coated abrasive material of FIG. 1.
Figure 3:
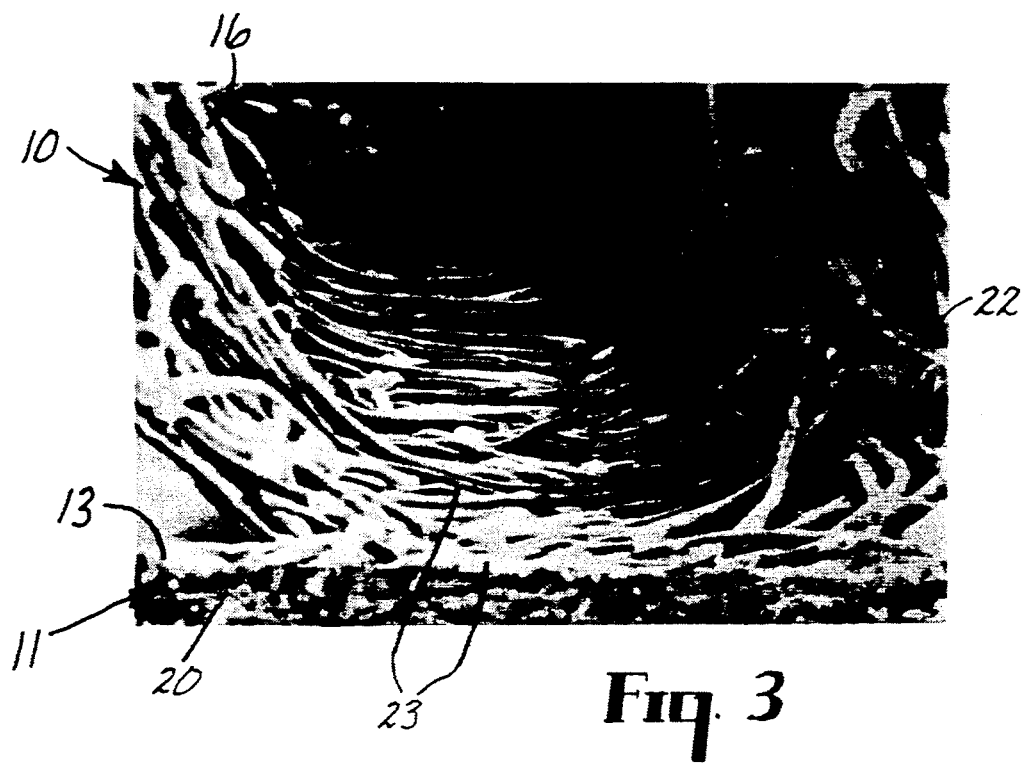
FIG. 3 is a photograph at 50× magnification of a sheet of fibers and a polymeric bonding layer included in the sheet of coated abrasive material of FIG. 1, in which photograph a second backing layer and a layer of abrasive of the sheet of coated abrasive material are not shown.

FIGS. 1, 2 and 3 illustrate a first embodiment of a sheet of coated abrasive material according to the present invention, generally designated by the reference numeral 10. The sheet 10 of coated abrasive material comprises a backing 11 having front and rear surfaces 12 and 13, a layer of abrasive grains 14 adhered to its front surface 12 by a layer 15 of bonding resin, and a multiplicity of loops 16 attached along and projecting from its rear surface 13. The sheet 10 of coated abrasive material is adapted to be held on the planar support surface 17 of a pad 18 from which project a multiplicity of semi-spherically headed generally mushroom shaped hooks 19 (e.g., the mushroom headed "Type 1H2" hooks described above which are commercially available from Kanebo BLT) by releasable engagement between the loops 16 and the hooks 19 while the sheet 10 of coated abrasive material is driven by the pad 18 (e.g., reciprocated, rotated or moved in a orbital pattern) along the plane of the support surface 17 to abrade a workpiece or substrate (not shown). The backing 11 comprises a layer 21 of backing material (e.g., of paper, cloth or polymeric material) defining the front surface 12 to which the layer 14 of abrasive grains is adhered, and a layer 20 of polymeric bonding material (e.g., of the thermoplastic polypropylene) in the range of about 0.00125 to 0.025 centimeters (0.0005 to 0.010 inch) thick having generally uniform morphology adhering to the surface of the layer 21 of backing material opposite the front surface 12 and defining the rear surface 13. The sheet 10 of coated abrasive material comprises a nonwoven sheet 22 of longitudinally oriented fibers having anchor portions 23 bonded by being embedded in the layer 20 of polymeric bonding material at spaced elongate generally parallel bonding locations that are continuous in one direction along the rear surface 13 with arcuate portions of the sheet 22 of fibers projecting from the rear surface 13 of the backing 11 between the bonding locations in continuous rows also extending transversely across the sheet 10 of coated abrasive material to provide the loops 16.

The arcuate portions of the sheet 22 of fibers that form the loops 16 when projecting to their maximum heights from the rear surface 13 have heights from the backing 11 of less than about 6.4 millimeters (0.250 inch) and preferably project in the range of about 0.5 millimeters (0.02 inch) to 3 millimeters (0.12 inch) with 2 millimeters (0.08 inch) being the maximum preferred height for loops 16 on sheets 10 of coated abrasive material that are to be stacked so that the heights of the stacked sheets 10 are minimized. The bonding locations should be quite narrow (e.g., 0.76 centimeter or 0.3 inch wide) and should be spaced apart to provide in the range of about 2 to 6 bonding locations per centimeter (5 to 15 bonding locations per inch) and preferably about 2.4 to 4.7 bonding locations per centimeter (6 to 12 bonding locations per inch) measured in a direction at a right angle to the lengths of the bonding locations. The individual fibers in the sheet 22 of fibers have diameters in the range of about 0.03 to 0.07 millimeter (0.0012 to 0.0027 inch) which range is about 6 to 35 denier for polypropylene fibers, with fibers in the range of 0.038 to 0.056 millimeter (0.0015 to 0.0022 inch) or 9 to 20 denier for polypropylene fibers being preferred. When polypropylene fibers are used the sheet 22 of fibers without the backing 11 should have a basis weight measured along the rear surface 13 in the range of about 15 to 70 grams per square meter, more preferably in the range of 25 to 50 grams per square meter, and preferably about 35 grams per square meter for 15 denier polypropylene fibers, to provide sufficient open area between the individual fibers in the sheet 22 of fibers along the arcuate portions that form the loops 16 (i.e., between about 50 to 90 percent open area) to afford easy movement of the hooks 19 through and into engagement with the arcuate portions of the sheet 22 of fibers whether the loops 16 are projecting from or lying along the rear surface 13, while providing sufficient fibers with sufficient strength to afford releasable engagement of the hooks 19 with the fibers forming the loops 16 to hold the sheet 10 of coated abrasive material along the support surface 17 of the pad 18 and to drive the sheet 10 of coated abrasive material from the pad 18 to abrade a substrate in a direction generally parallel to the support surface 17.

The fibers in the sheet 22 of fibers can be disposed in various directions with respect to the parallel bonding locations at which the anchor portions 23 are embedded in the layer 20 of polymeric bonding material, can cross and typically contact each other, and may or may not be bonded together at crossover points in the arcuate portions that provide the loops 16; can be disposed in various directions with respect to the parallel bonding locations with the majority of the fibers in the sheet 22 of fibers (e.g., in the range of 66 to 90 percent) extending in directions at about a right angle to the bonding locations; or all of the individual fibers in the sheet 22 of fibers 16 can extend in directions generally at right angles to the spaced generally parallel bonding locations.

Figure 4:
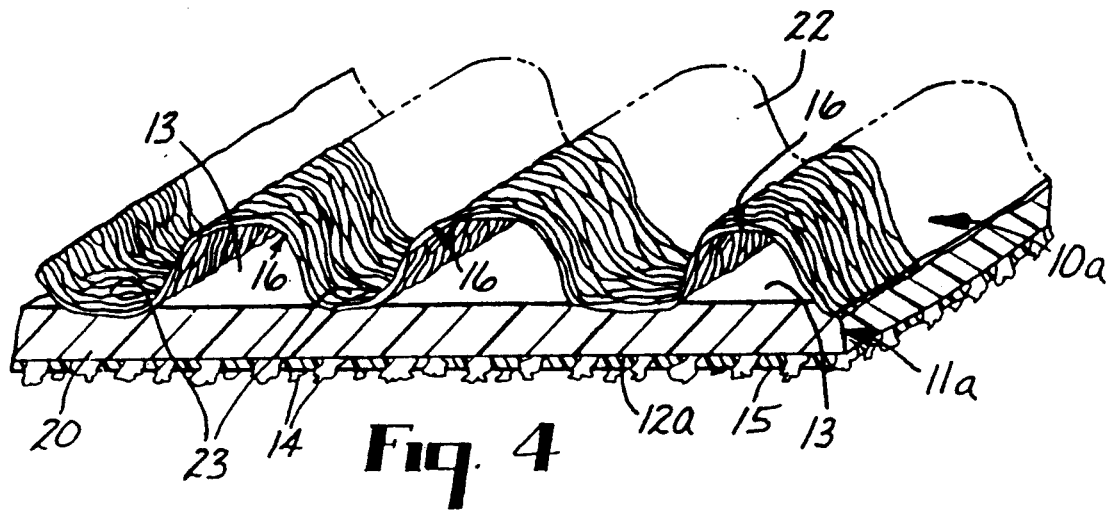
FIG. 4 is a fragmentary perspective sectional view of a second embodiment of a sheet of coated abrasive material according to the present invention.

FIG. 4 illustrates a second embodiment of a sheet of coated abrasive material according to the present invention, generally designated by the reference numeral 10a. The sheet 10a of coated abrasive material has generally the same structure as the sheet of coated abrasive sheet material 10 (the same reference numerals being used with respect to the corresponding portions thereof) except that the backing 11a of the sheet 10a of coated abrasive material consists only of the layer 20 of polymeric bonding material which defines both the front surface 12a and the rear surface 13 of the backing 11a.

Figure 5:
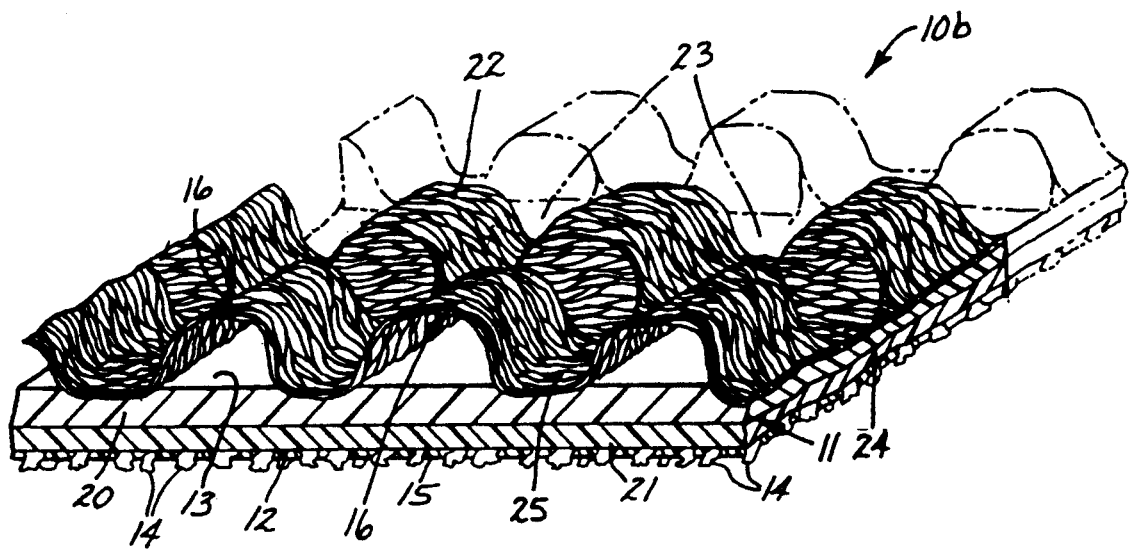
FIG. 5 is a fragmentary perspective sectional view of a third embodiment of a sheet of coated abrasive material according to the present invention.
Figure 7:
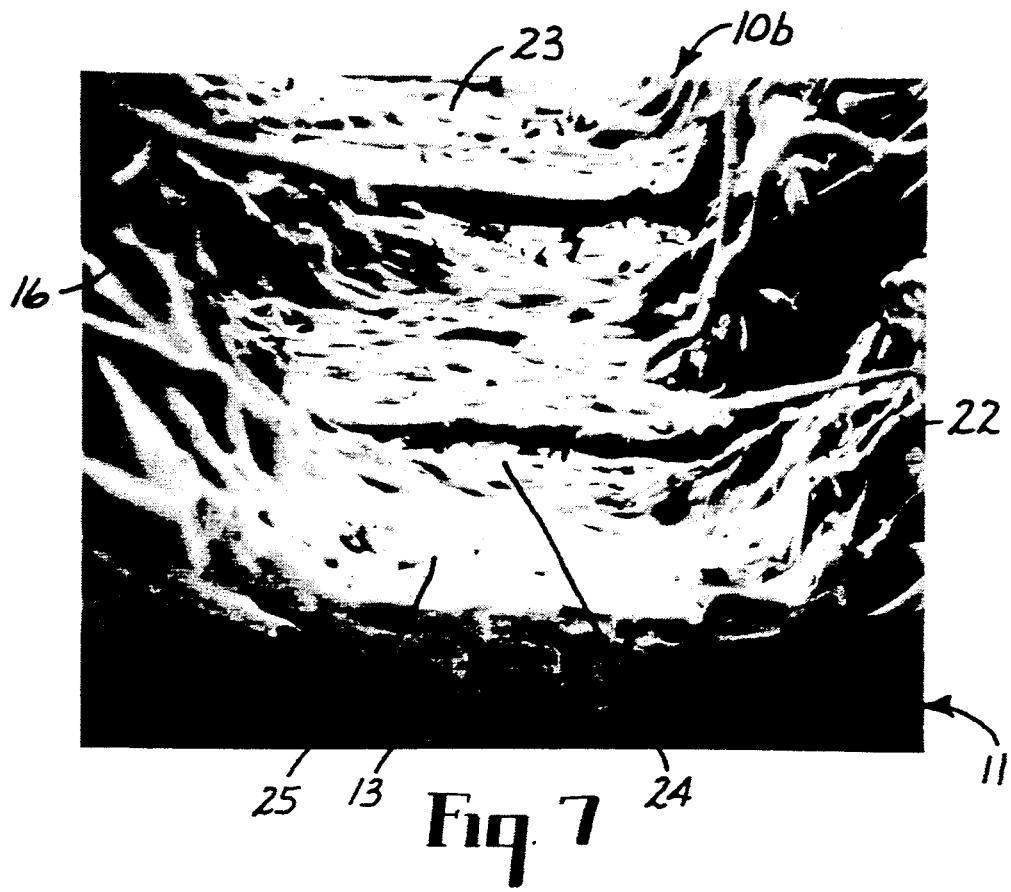
FIG. 7 is a photograph at 50× magnification of a sheet of fibers and a polymeric bonding layer included in the sheet of coated abrasive material of FIG. 5, in which photograph a second backing layer and a layer of abrasive of the sheet of coated abrasive material are not shown.
Figure 6:
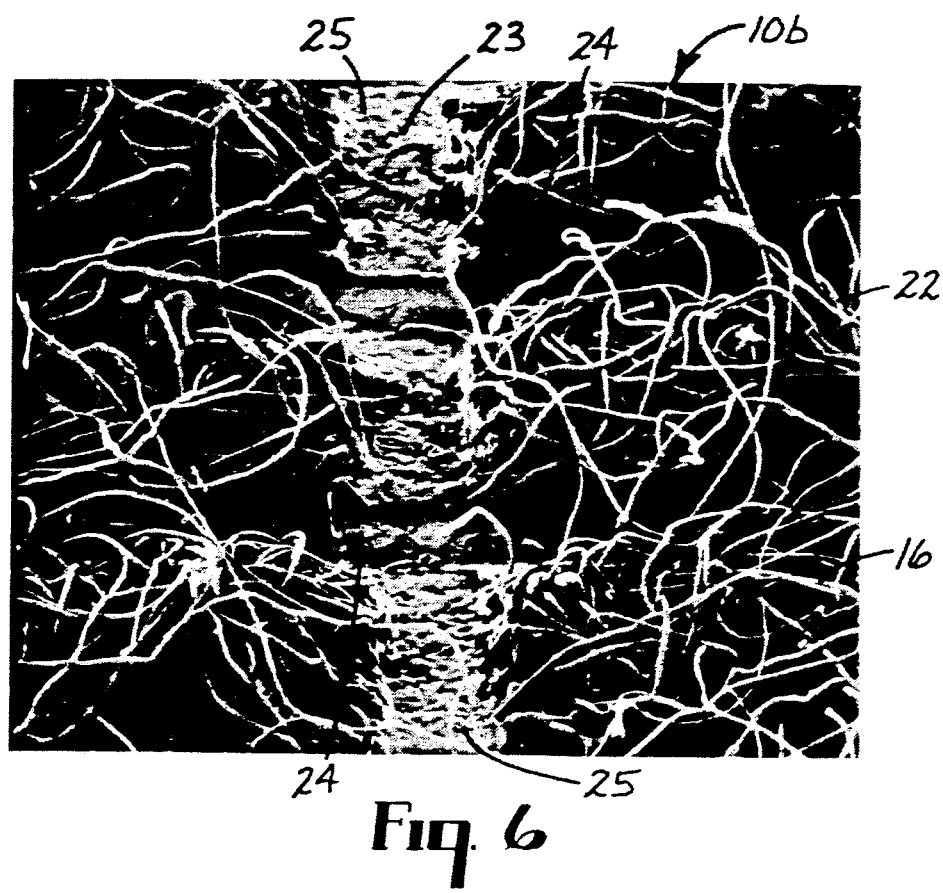
FIG. 6 is a photograph at 15× magnification of a sheet of fibers included in the sheet of coated abrasive material of FIG. 5.

FIGS. 5, 6 and 7 illustrates a third embodiment of a sheet of coated abrasive material according to the present invention, generally designated by the reference numeral 10b. The sheet 10b of coated abrasive material has generally the same structure as the sheet 10 of coated abrasive material (the same reference numerals being used with respect to the corresponding portions thereof) except that in the sheet 10b of coated abrasive material the nonwoven sheet 22 of longitudinally oriented fibers has anchor portions 23 bonded by being embedded in the layer 20 of polymeric bonding material at both a first set 24 of spaced elongate generally parallel bonding locations that are continuous in one direction along the rear surface 13 and at a second set 25 of spaced elongate generally parallel bonding locations that are continuous in a second direction along the rear surface 13 that is about at a right angle with respect to the first direction, with arcuate portions of the sheet 22 of fibers projecting from the rear surface 13 of the backing layer 12 between the bonding locations in rectangular areas (e.g., areas 0.64 centimeter by 0.25 centimeter or 0.25 inch by 0.1 inch in size).

The front or rear surfaces 12, 12a, or 13 of the sheets 10, 10a, or 10b of coated abrasive material could be printed to provide sheets 10, 10a, or 10b of coated abrasive material on which such printing (which could, for example, designate abrasive grade, indicate a trade name, or provide instructions) can be clearly seen and read through the loops 16 or, when the abrasive grains are sufficiently small and/or transparent, through the layer of abrasive grains 14.

Figure 8:
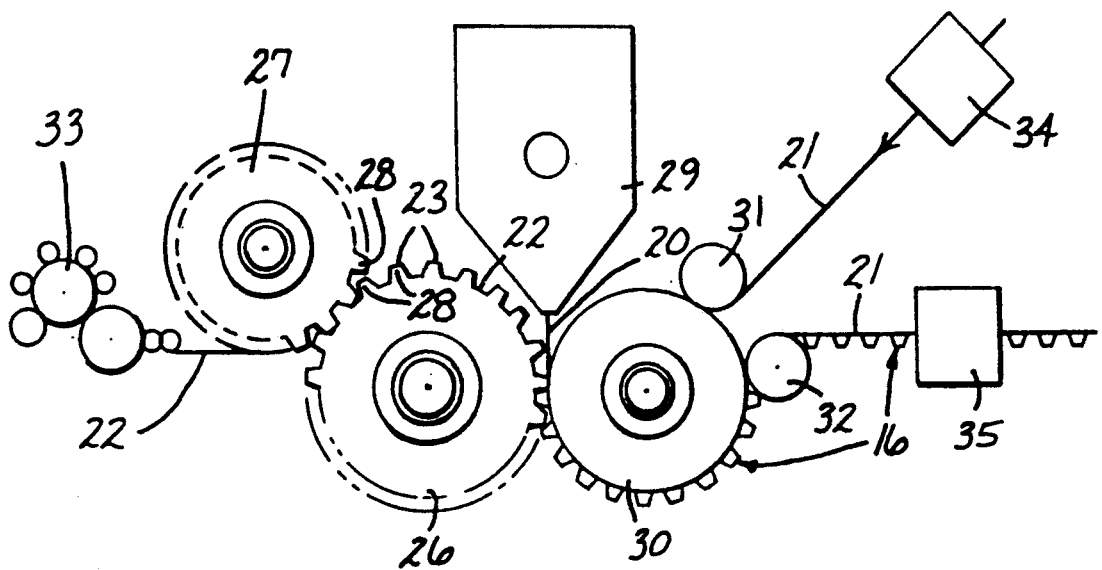
FIG. 8 is a schematic view illustrating a portion of a first method according to the present invention for making the coated abrasive sheet material of FIGS. 1 through 3.

FIG. 8 schematically illustrates a portion of a first method according to the present invention for forming the sheet 10 of coated abrasive material illustrated in FIGS. 1 through 3. The portion of the method illustrated in FIG. 8 generally comprises forming longitudinally oriented polymeric fibers into a sheet 22 of fibers, forming the sheet 22 of fibers so that it has arcuate portions projecting in the same direction from spaced generally parallel anchor portions 23 of the sheet 22 of fibers, and bonding the spaced generally parallel anchor portions 23 of the sheet 22 of fibers in the backing 11 with the arcuate portions of the sheet 22 of fibers projecting from the rear surface 13 of the backing 11 to form loops 16. This is done by providing first and second heated corrugating members or rollers 26 and 27 each having an axis about which it is mounted for for rotation, and including a plurality of circumferentially spaced generally axially extending ridges 28 around and defining its periphery, with the ridges 28 having outer surfaces and defining spaces between the ridges 28 adapted to receive portions of the ridges 28 of the other corrugating member 26 or 27 in meshing relationship with the sheet 22 of fibers between the meshed ridges 28 and to afford rolling engagement between the ridges 28 and spaces of the corrugating members in the manner of gear teeth. The corrugating members 26 and 27 are mounted for rotation in axially parallel relationship with portions of the ridges 28 of the corrugating members 26 and 27 meshing generally in the manner of gear teeth; at least one of the corrugating members 26 or 27 is driven so that the corrugating members 26 and 27 rotate; and the sheet 22 of fibers is fed between the meshed portions of the ridges 28 of the corrugating members 26 and 27 to generally conform the sheet 22 of fibers to the periphery of the first corrugating member 26 and form the arcuate portions of the sheet 22 of fibers that provide the loops 16 in the spaces between the ridges 28 of the first corrugating member 26 and the generally parallel anchor portions 23 of the sheet 22 of fibers along the outer surfaces of the ridges 28 on the first corrugating member 26. The formed sheet 22 of fibers is retained along the periphery of the first corrugating member 26 after it has moved past the meshed portions of the ridges 28. The backing 11 is formed and bonded to the anchor portions 23 of the sheet 22 of fibers on the end surfaces of the ridges 28 on the first corrugating member 26 by forming or extruding the layer 20 of polymeric bonding material (e.g., polypropylene) in a liquid state from a die 29 of an extruder and depositing it between the formed sheet 22 of fibers along the periphery of the first corrugating member 26 and the layer 21 of backing material fed along the surface of a cooling roll 30 under a guide roller 31 so that the anchor portions 23 of the sheet of fibers 16 are immersed in the layer 20 of liquid polymeric bonding material which adheres to the layer 21 of backing material after which the sheet 10 of coated abrasive material is separated from the first corrugating member 26 and carried partially around the cooling roll 30 to a nip between the cooling roll 30 and a guide roller 32 with its backing 11 against the cooling roll 30 to complete cooling and solidification of the layer 20 of polymeric bonding material. The liquid layer 20 of polymeric bonding material can be extruded as a molten liquid or pumped through a die into the nip, onto the anchor portions 23 of the sheet 22 of fibers on the first corrugating member 26 prior to the nip, or onto the layer 21 of backing material along the periphery of the cooling roll 30 just prior to the nip as may work best for any given application. The cooling roll 30 can be cooled below the temperature of the liquid layer 20 with oil or water. The cooling roll 30 can have a chrome plated periphery which can be particularly useful if the layer 21 of backing material is of a polymeric material because of the high rate of heat transfer such a cooling roll 30 affords from the liquid layer 20 of polymeric bonding material if it is molten, through the layer 21 of backing material and into the cooling roll 30. Alternatively, the cooling roll 30 can have an outer rubber layer defining its surface which may be preferred for forming the sheet 10 of coated abrasive material if the layer 21 of backing material is of a material (e.g., paper) that tends to restrict such heat transfer into the cooling roll 30, or if the liquid layer 20 is not molten, whereupon the rubber layer provides an alternative advantage of deforming adjacent its nip with the first corrugating roller 26 to provide intimate contact of the layer 20 of liquid polymeric bonding material with the anchor portions 17 of the sheet 22 of fibers and the layer 21 of backing material.

The fibers in the sheet 22 of fibers fed between the meshed portions of the ridges 28 of the corrugating members 26 and 27 can be in the form of yarns or monofilaments distributed so that the fibers in the sheet 22 of fibers fed between the meshed ridges 28 of the corrugating members 26 and 27 are uniformly distributed across the width of the sheet 22 of fibers and all extend generally perpendicular to the axes of the corrugating members 26 and 27, or the fibers in the sheet 22 of fibers can be disposed in random orientation as in a nonwoven web or sheet, which web may have a majority of the fibers oriented in one direction. Such a nonwoven sheet 22 of randomly oriented fibers with no internal bonding except for the friction between the fibers can be formed from loose fibers using a carding machine 33 as illustrated, which nonwoven sheet 22 of randomly oriented fibers 22 has enough integrity to be fed from the carding machine 33 into the nip between the corrugating members 26 and 27. If needed, a conveyer (not shown) could be provided to help support and guide the nonwoven sheet 22 of fibers between the carding machine 33 and the corrugating members 26 and 27. When such a nonwoven sheet 22 of randomly oriented fibers is used, preferably the first corrugating member 26 has a rough finish (e.g., formed by sand blasting), the second corrugating member 27 has a smooth polished finish, and the first corrugating member 26 is heated to a temperature slightly above the temperature of the second corrugating member 27 so that the nonwoven sheet 22 of fibers will preferentially stay along the surface of the first corrugating member 26 and be carried to the nip between the first corrugating member 26 and the cooling roller 25 after passing through the nip between the corrugating members 26 and 27.

The layer 21 of backing material incorporated into the backing 11 can be of any one the materials used as a backing for sheets of coated abrasive (i.e., paper, cloth, polymeric films, nonwoven layers) almost any of which can be printed by conventional methods along one of its surfaces with graphics (such as abrasive size information, trademarks or instructions) which, if the layer 20 of polymeric bonding material is transparent, can be visible through the layer 20 of polymeric bonding material and the sheet 22 of fibers due to the large percentage of open area in the sheet 22 of fibers.

In addition to the portion of the first method according to the present invention for forming the sheet 10 of coated abrasive material illustrated in FIG. 8, that first method further includes the step of adhering the layer 14 of abrasive grains to the front surface 12 of the layer 21 of backing material with a layer 15 of bonding resin which is done in a conventional manner either before or after the sheet 22 of fibers is formed and attached to the rear surface 13 of the backing 11 in the manner described above.

Optionally the layer 21 of backing material can be printed on its surface to which the sheet 22 of fibers is to be adhered through the use of a conventional printer 34, or the backing 11 of the sheet of loop material 10 can be printed on its surface opposite the sheet 22 of fibers through the use of a conventional printer 35, either in the production line as illustrated, or as a separate operation. Alternatively, the printer 35 could be used to print on the sheet 22 of fibers 22 either in the production line as illustrated, or as a separate operation.

Corrugating members 26 and 27 adapted to have such a sheet of fibers 22 fed into them can have their ridges 28 oriented generally in the range of 0 to 45 degrees with respect to their axes, but preferably have their ridges 28 oriented at 0 degrees with respect to (or parallel to) their axes which simplifies making of the corrugating members 26 and 27.

Figure 9:
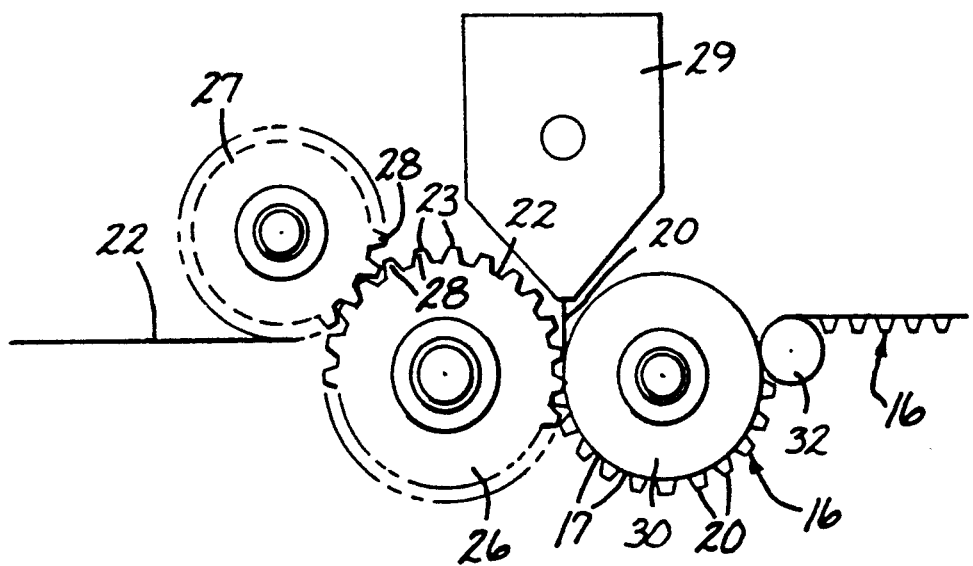
FIG. 9 is a schematic view illustrating a portion of a method according to the present invention for making the coated abrasive sheet material of FIG. 4.

FIG. 9 schematically illustrates a portion of a second method according to the present invention for forming the sheet of coated abrasive sheet material 10a illustrated in FIG. 4, which method is generally the same and uses much of the same equipment as is illustrated in FIG. 8 (with similar portions of that equipment having the same reference numerals), except that the means including the pinch or guide roller 31 is not provided for feeding the layer 21 of backing material into the nip between the first corrugating roller 26 and the cooling roller 30 along the surface of the cooling roller 30 so that the layer 20 of polymeric bonding material extruded in a liquid form from the die 29 forms the entire backing 11a, and the portion of the second method not illustrated that comprises adhering the layer 14 of abrasive grains to the front surface 12 of the backing 11a with a layer 15 of bonding resin in a conventional manner is done after the sheet 22 of fibers is formed and attached to the rear surface 13 of the backing 11a. The liquid layer 20 of polymeric bonding material can be pumped or extruded from the die 29 into the nip, onto the anchor portions 23 of the sheet 22 of fibers on the first corrugating member 26 prior to the nip, or onto the periphery of the cooling roll 30 just prior to the nip as may work best for any given application. When the layer 21 of polymeric bonding material is extruded so that it is molten, the cooling roll 30 preferably is cooled (e.g., with oil above room temperature or with water) and has a chrome plated periphery to provide a high rate of heat transfer into the cooling roll 30 from the molten layer 21 of polymeric bonding material.

Figure 11:
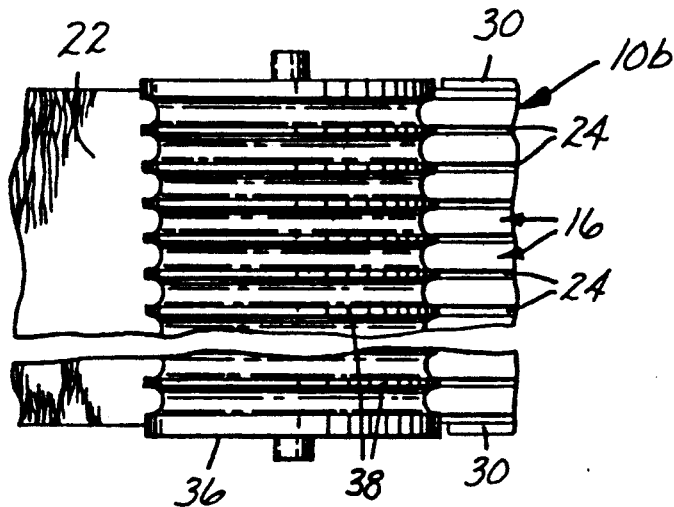
FIG. 11 is a fragmentary view taken approximately along lines 11-11 of FIG. 10.
Figure 10:
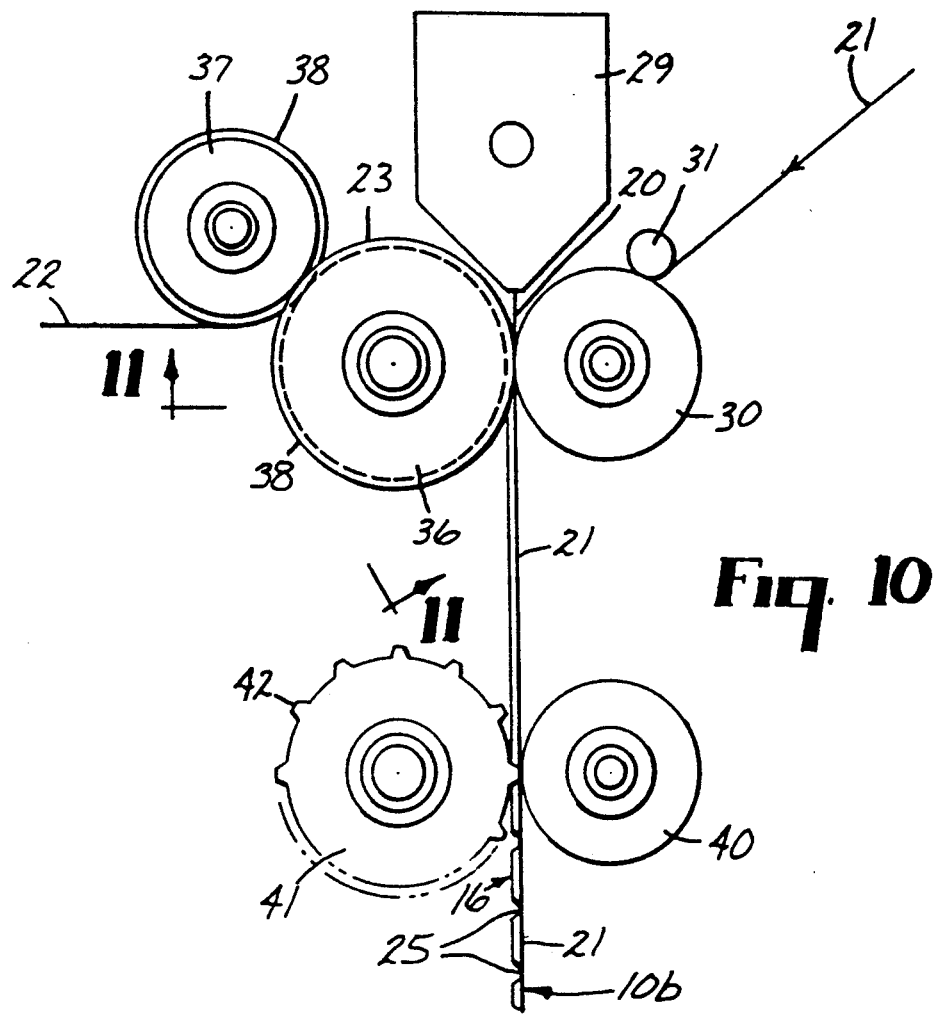
FIG. 10 is a schematic view illustrating a portion of a second method according to the present invention for making the coated abrasive sheet material of FIGS. 5 through 7.

FIGS. 10 and 11 schematically illustrate a portion of a third method according to the present invention for forming the sheet of abrasive coated material 10b, which method is generally the same and uses much of the same equipment as is illustrated in FIG. 8 (with similar portions of that equipment having the same reference numerals), except that the first and second corrugating members 26 and 27 are replaced by first and second cylindrical heated corrugating members or rollers 36 and 37 each having an axis and including a plurality of generally annular, circumferentially extending, axially spaced parallel elongate ridges 38 around and defining its periphery, with the ridges 38 having outer surfaces and defining spaces between the ridges 38 adapted to receive portions of the ridges 38 of the other corrugating member 36 or 37 in meshing relationship with the sheet 22 of fibers between the meshed portions of the ridges 38. The corrugating members 36 and 37 are rotatably mounted in axially parallel relationship to mesh portions of the ridges 38 of the corrugating members 36 and 37; at least the first corrugating member 36 is rotated; and the sheet 22 of fibers is fed between the meshed portions of the ridges 38 of the corrugating members 36 and 37 to generally conform the sheet 22 of fibers to the periphery of the first corrugating member 36 and form the arcuate portions of the sheet 22 of fibers that provide the loops 16 in the spaces between the ridges 38 of the first corrugating member 36 and the first set 24 of generally parallel anchor portions 23 of the sheet 22 of fibers along the outer surfaces of the ridges 38. The formed sheet 22 of fibers is retained along the periphery of the first corrugating member 36 after separation of the ridges 38; the liquid layer 20 of polymeric bonding material pumped or extruded in molten form from the die 29 is deposited between the formed sheet 22 of fibers along the periphery of the first corrugating member 36 and the layer 21 of backing material along the surface of the cooling roll 30 so that the liquid layer 20 of polymeric bonding material envelopes and adheres the first set of anchor portions 23 of the sheet 22 of fibers to the layer 21 of backing material as it is formed to provide the first set of parallel bonding locations 24. Next the layer 21 of backing material and the formed sheet 22 of fibers adhered thereto by the layer 20 of polymeric bonding material pass through the nip between a support roll 40 and a pressing member or roller 41 mounted for rotation around its axis. The pressing roller 41 includes a plurality of circumferentially spaced generally axially extending circumferentially spaced ridges 42 around and defining its periphery. Thus a second set of transverse anchor portions 23 of the sheet 22 of fibers are pressed into and thereby become embedded or immersed in the still soft layer 20 of polymeric bonding material carried by the layer 21 of backing material by the ridges 42 to provide the second set of parallel bonding locations 25. The sheet 10b of coated abrasive material is then separated from the pressing roller 41 to complete solidification of its layer 20 of polymeric bonding material.

Instead of extending generally axially, the ridges 42 on the pressing roller 41 could be disposed at an angle to the axis of the roller 41 to provide areas of projecting loops that are in the shape of parallelograms rather in the shape of rectangles. Two pressing rollers could be used with ridges disposed at different angles with respect to the axes of the pressing rollers to form triangular and/or diamond shaped areas of projecting loops. Additionally, the ridges on the pressing roller 41 could have other shapes, such as a herringbone shape, or could include ridges shaped to form patches of loops in the shape of letters and/or numbers which might be, for example, a trademark for the manufacturer of the abrasive sheet material.

The sheet 22 of fibers fed between the meshed ridges 38 of the corrugating members 36 and 37 can be in the form of a nonwoven web formed by lightly adhering the fibers together, or another sheet formed of the fibers that has sufficient internal strength so that the sheet of fibers 22 will corrugate longitudinally while expanding across its width to conform to the ridges 38 as it is moves through the nip between the meshing ridges 38 of the corrugating members 36 and 37. Preferably a majority of the fibers in such a nonwoven web or sheet 22 of fibers are oriented longitudinally in the direction that the sheet 22 of fibers is fed between the corrugating members 36 and 37 which allows the fibers in the sheet 22 of fibers to be easily separated transverse of the sheet 22 of fibers to facilitate such corrugation and widthwise expansion of the sheet 22 of fibers. This then results in a majority of the fibers in the resultant sheet 10b of abrasive coated material extending in directions about parallel to the first set 24 of parallel bonding locations, and at about right angles to the second set 25 of parallel bonding locations so that the second set 25 of parallel bonding locations has the most effect in bonding the fibers in the layer 20 of polymeric bonding material.

Figure 12:
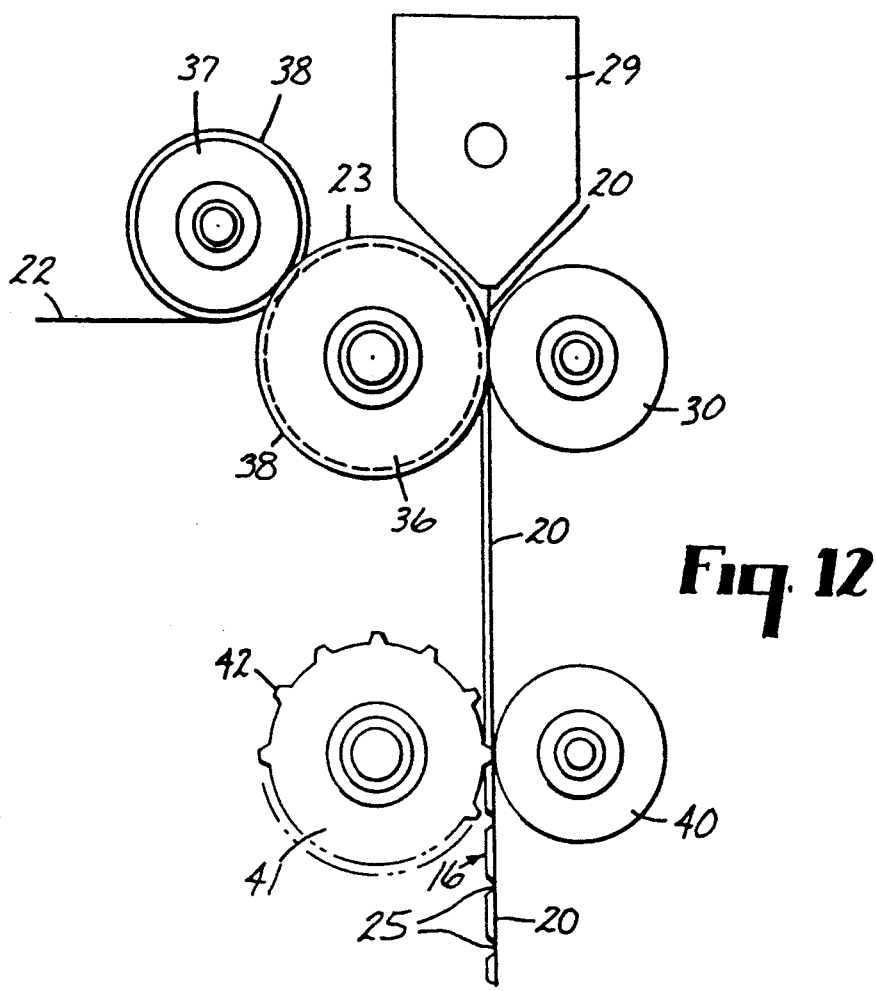
FIG. 12 is a schematic view illustrating a portion of a third method according to the present invention for making the coated abrasive sheet material illustrated in FIG. 13.
Figure 13:
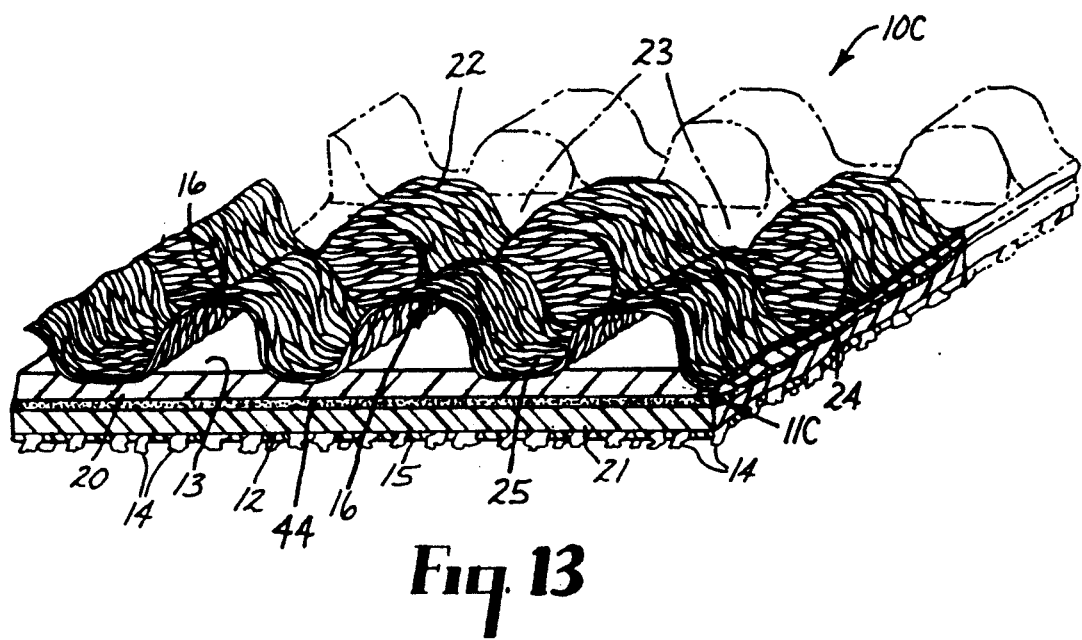
FIG. 13 is a fragmentary perspective sectional view of a fourth embodiment of a sheet of coated abrasive material according to the present invention.

FIG. 12 schematically illustrates a portion of a fourth method according to the present invention for forming a sheet of abrasive coated material 10c illustrated in FIG. 13. That method portion is generally the same and uses the same equipment that is illustrated in FIG. 10 (with similar portions of that equipment having the same reference numerals), except that no layer of backing material is fed around the surface of the cooling roll 30. The liquid layer 20 of polymeric bonding material pumped through or extruded in molten form from the die 29 is deposited between the formed sheet 22 of fibers along the periphery of the first corrugating member 36 and the surface of the cooling roll 30 so that the liquid layer 20 of polymeric bonding material solidifies to form a sheet 20 that envelopes and adheres a first set of anchor portions 23 of the sheet 22 of fibers to itself to provide the first set of parallel bonding locations 24. The sheet formed by the layer 20 of polymeric bonding material and the formed sheet 22 of fibers adhered thereto then pass through the nip between a support roll 40 and a pressing member or roller 41 mounted for rotation around its axis. The pressing roller 41 includes a plurality of circumferentially spaced axially extending ridges 42 around and defining its periphery so that a second set of transverse anchor portions 23 of the sheet 22 of fibers are pressed into and thereby become immersed in the still soft sheet 20 formed by the layer 20 of polymeric bonding material to provide the second set of parallel bonding locations 25. After the sheet 20 formed by the layer 20 of polymeric bonding material has fully solidified, the surface of that sheet 20 opposite the sheet 22 of fibers is laminated to the surface of a layer 21 of backing material (e.g., of paper, cloth or polymeric material) having a front surface 12 to which a layer of abrasive grains 14 is already adhered by a layer 15 of bonding resin to form the coated abrasive sheet material illustrated in FIG. 13. Such lamination is not illustrated but may be done by conventional laminating techniques using a layer 44 of adhesive material which may, for example, be a thermoplastic, thermoset, or pressure sensitive adhesive such as an acrylate based adhesive or a tackified rubber based adhesive, and may be a continuous layer 44 of adhesive or a layer of adhesive defined by separate parts such as spaced bars or dots of adhesive. Such lamination could be done by applying the layer 44 of adhesive material between the sheet 20 formed by the layer 20 and the layer 21 of backing material during lamination, or the layer of adhesive 44 could be applied either to the layer 21 of backing material o to the sheet 20 before lamination and could be adhered to the sheet 20 or to the layer 21 of backing material during lamination if the layer of adhesive 44 is a pressure sensitive adhesive or is re-activatable during lamination as by the application of heat or otherwise.

Figure 14:
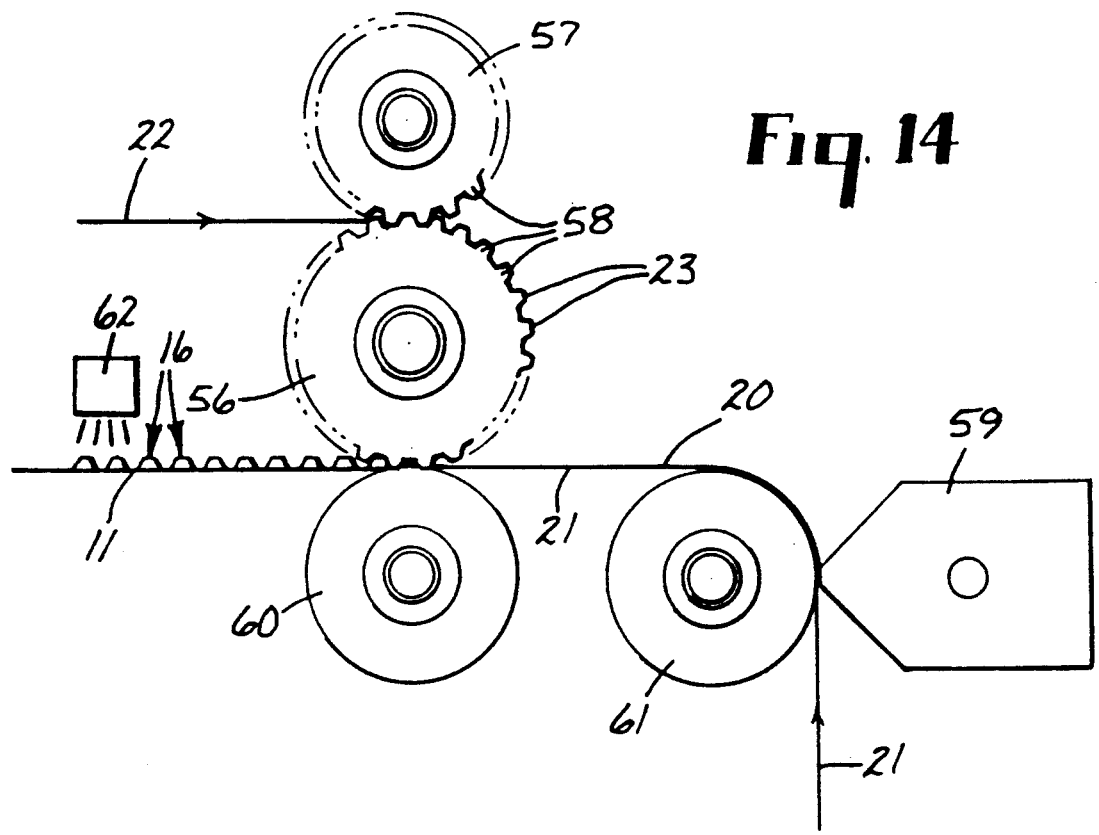
FIG. 14 is a schematic view illustrating a portion of a fifth method according to the present invention for making the coated abrasive sheet material of FIGS. 1 through 3.

FIG. 14 schematically illustrates a portion of a fifth method according to the present invention for forming the sheet 10 of coated abrasive material illustrated in FIGS. 1 through 3. The portion of the method illustrated in FIG. 12 generally comprises forming longitudinally oriented polymeric fibers into a sheet 22 of fibers, forming the sheet 22 of fibers so that it has arcuate portions projecting in the same direction from spaced generally parallel anchor portions 23 of the sheet 22 of fibers, and bonding the spaced generally parallel anchor portions 23 of the sheet 22 of fibers in the backing 11 with the arcuate portions of the sheet 22 of fibers projecting from the rear surface 13 of the backing 11 to form loops 16. This is done by providing first and second heated corrugating members or rollers 56 and 57 each having an axis about which it is mounted for rotation, and including a plurality of circumferentially spaced generally axially extending ridges 58 around and defining its periphery. The ridge 58 of each corrugating member 56 or 57 are adapted to receive portions of the ridges 58 of the other corrugating member 56 or 57 in meshing relationship with the sheet 22 of fibers in spaces between the meshed ridges 58 and to afford rolling engagement between the ridges 58 in the manner of gear teeth. At least one of the corrugating members 56 or 57 is driven so that the corrugating members 56 and 57 rotate. The sheet 22 of fibers is fed between the meshed portions of the ridges 58 of the corrugating members 56 and 57 to generally conform the sheet 22 of fibers to the periphery of the first corrugating member 56 and form the arcuate portions of the sheet 22 of fibers that provide the loops 16 in the spaces between the ridges 58 of the first corrugating member 56 and the generally parallel anchor portions 23 of the sheet 22 of fibers along the outer surfaces of the ridges 58 on the first corrugating member 56. The formed sheet 22 of fibers is retained along the periphery of the first corrugating member 56 after it has moved past the meshed portions of the ridges 58. The backing 11 is formed and bonded to the anchor portions 23 of the sheet 22 of fibers on the end surfaces of the ridges 58 on the first corrugating member 56 by forming the layer 20 of polymeric bonding in a liquid state from a coating die 59 fed by a supply system (not shown) and depositing it on the layer 21 of backing material as the layer 21 of backing material moves around a support roller 61. The liquid layer 20 of polymeric bonding material is then carried with the layer 21 of backing material to the nip between the first corrugating member 56 and a rubber covered pressure roll 60 so that the anchor portions 53 of the sheet of fibers 16 are immersed in the layer 20 of liquid polymeric bonding material adhered to the layer 21 of backing material after which the layer 20 of polymeric bonding material solidifies, which, if the layer is of the proper material, may be facilitated by a source 62 of thermal or radiated energy (e.g., infrared, ultraviolet, or electron beam energy, etc.).

In addition to the portion of the fifth method according to the present invention for forming the sheet 10 of coated abrasive material illustrated in FIG. 14, that method further includes the step of adhering the layer 14 of abrasive grains to the front surface 12 of the layer 21 of backing material with a layer 15 of bonding resin which is done in a conventional manner either before or after the sheet 22 of fibers is formed and attached to the rear surface 13 of the backing 11 in the manner described above.

Figure 16:
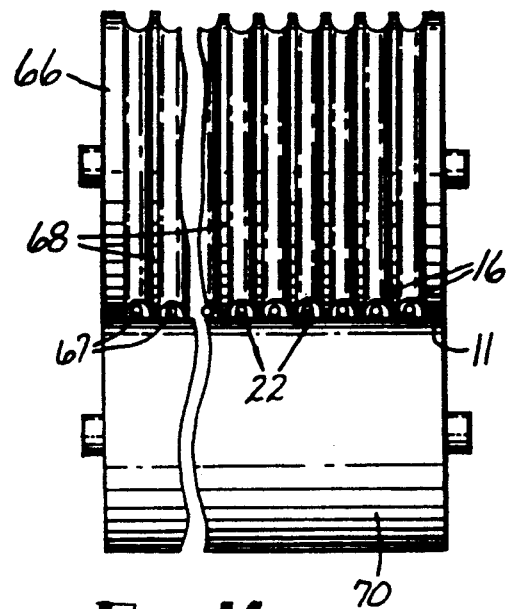
FIG. 16 is a fragmentary enlarged view taken approximately along lines 16—16 of FIG. 15.
Figure 15:
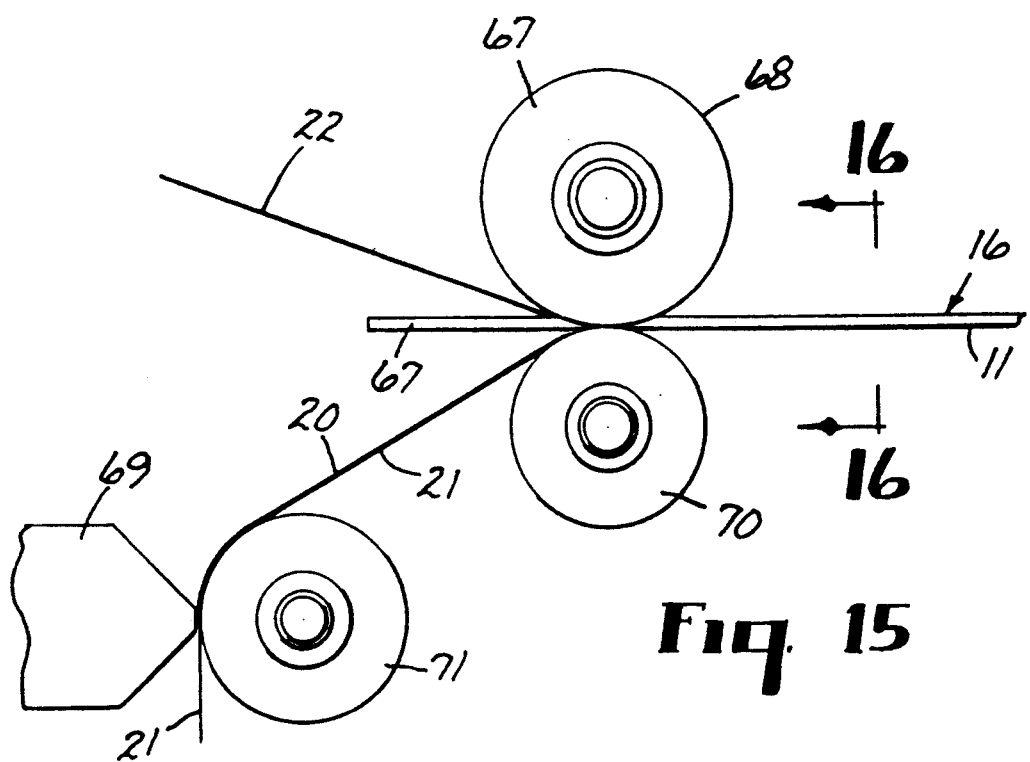
FIG. 15 is a schematic view illustrating a portion of a sixth method according to the present invention for making the coated abrasive sheet material of FIG. 5.

FIGS. 15 and 16 schematically illustrate a portion of a sixth method according to the present invention for forming the sheet 10 of coated abrasive material illustrated in FIGS. 1 through 3. The portion of the method illustrated in FIGS. 15 and 16 generally comprise forming longitudinally oriented polymeric fibers into a sheet 22 of fibers, forming the sheet 22 of fibers so that it has arcuate portions projecting in the same direction from spaced generally parallel anchor portions 23 of the sheet 22 of fibers, and bonding the spaced generally parallel anchor portions 23 of the sheet 22 of fibers in the backing 11 with the arcuate portions of the sheet 22 of fibers projecting from the rear surface 13 of the backing 11 to form loops 16. This is done by providing a cylindrical corrugating member or roller 66 having an axis, which roller 66 is mounted for rotation about its axis, and includes a plurality of generally annular, circumferentially extending, axially spaced parallel elongate ridges 68 around and defining its periphery, with the ridges 68 having outer surfaces and defining spaces between the ridges 68 adapted to receive fixed elongate guides 67 with the sheet 22 of fibers between the guides 67 and the ridges 38. The corrugating member 66 is rotated; and the sheet 22 of fibers is fed between the ridges 68 of the corrugating member 66 and the guides 67 to generally conform the sheet 22 of fibers to the periphery of the first corrugating member 66 and form the arcuate portions of the sheet 22 of fibers that provide the loops 16 in the spaces between the ridges 38 of the first corrugating member 36 and a first set of generally parallel anchor portions 23 of the sheet 22 of fibers along the outer surfaces of the ridges 68. The backing 11 is formed and bonded to the anchor portions 23 of the sheet 22 of fibers on the end surfaces of the ridges 68 on the corrugating member 66 by forming the layer 20 of polymeric bonding material in a liquid state from a slot die 69 fed by a supply system (not shown) and depositing it on the layer 21 of backing material as the layer 21 of backing material moves around a support roller 71. The liquid layer 20 of polymeric bonding material is then carried with the layer 21 of backing material to the nip between the corrugating member 66 and a rubber covered pressure roll 70 so that the anchor portions 23 of the sheet of fibers 16 are immersed in the layer 20 of liquid polymeric bonding material adhered to the layer 21 of backing material after which the layer 20 of polymeric bonding material cools and solidifies.

In addition to the portion of the sixth method according to the present invention for forming the sheet 10 of coated abrasive material illustrated in FIGS. 15 and 16, that method further includes the step of adhering the layer 14 of abrasive grains to the front surface 12 of the layer 21 of backing material with a layer 15 of bonding resin which is done in a conventional manner either before or after the sheet 22 of fibers is formed and attached to the rear surface 13 of the backing 11 in the manner described above.

The sixth method according to the present invention illustrated in FIGS. 15 and 16 could further involve the use of a support roll and a pressing member or roller similar to the support roll 40 and the pressing member or roller 41 illustrated in FIG. 10 to form and press a second set of transceivers anchor portions of the sheet of fibers 22 into the soft layer 20 of polymeric bonding material carried by the layer 21 of backing material to provide a second set of parallel bonding locations and form the sheet 10b of coated abrasive material instead of the sheet 10 of coated abrasive material if that were desired.

EXAMPLE 1

Equipment similar to that illustrated in FIGS. 10 and 11 was used to form an example of the sheet of abrasive coated material 10b illustrated in FIG. 5. The ridges 38 on the first corrugating roller 36 had an axial width at their distal ends of about 0.159 centimeter (0.063 inch), tapered towards the axis of the roller 36 at an angle of about 10 degrees, and were spaced axially of the roller 36 at about 0.254 centimeter (0.1 inch). The ridges 38 on the corrugating rollers 36 and 37 were shaped to provide clearances of about 0.01 centimeter (0.004 inch) between their surfaces, and the ridges 38 on the second corrugating roller 36 projected about 0.305 centimeter (0.12 inch) into the spaces between the ridges 38 on the first corrugating roller 36. The ridges 42 on the pressing member 41 were disposed parallel to its axis, had a circumferential width at their distal ends of about 0.427 centimeter (0.17 inch), tapered towards the axis of the roller 36 at and angle of about 20 degrees, and were spaced circumferentially of the roller 36 at about 0.38 centimeter (0.15 inch). The sheet 22 of fibers fed between the corrugating members 36 and 37 was formed of 15 denier, 4.763 centimeter (1.875 inch) long polypropylene fibers (type T-182 commercially available from Hercules Corporation, Covington, Ga.) formed on a carding machine at a basis weight of 35 grams per square meter and was thermally bonded along narrow bonding lines disposed in a diamond pattern and spaced at 0.635 centimeter (0.25 inch) intervals so that the sheet 22 of fibers had enough internal strength to remain intact as it was fed between the corrugating rollers 36 and 37. The corrugating roller 36 was heated by oil at about 155 degrees Centigrade (310 degrees Fahrenheit), and the pressing roller 41 was heated by oil at about 204 degrees Centigrade (400 degrees Fahrenheit), it being estimated that their surface temperatures were 5 to 10 Centigrade degrees (10 to 20 Fahrenheit degrees) cooler than the oil that heated them. The liquid layer 20 of polymeric bonding material extruded in molten form from the die 29 was polypropylene commercially available either from Shell Chemical Company, Houston, Tex., under the trade designation DS7C50, from Himont USA, Wilmington, Del., under the trade designation PF-611, or from Fina Corporation, Dallas, Tex., under the trade designation 8573 (all three were used). The die temperature was about 274 degrees Centigrade (525 degrees Fahrenheit), and the layer 20 formed was about 0.006 centimeter (0.0025 inch) thick. The layer 21 of backing material was 27 kilogram (60 pound) Fourdrinier Base paper coated with 24 grams per square meter (15 pounds per 3000 square feet) of polypropylene commercially available from Thilmany Pulp and Paper, Kaukauna, Wis.. The paper layer 20 had a normal coating of grade 80 abrasive grains 14 adhered by a resin layer 24 to its surface opposite its coating of polypropylene in a conventional manner prior to having the layer 22 of fibers adhered to its polypropylene coated surface, and the cooling roller 30 and the support roll 40 were rubber coated to facilitate that abrasive coating. Sheets 10b of the resultant abrasive coated material were found to adhere well to the pad commercially available as the "Hookit" Disc Pad, part 051131-05776, from Minnesota Mining and Manufacturing Company, St. Paul, Minn., which has a support surface covered by the "Type 1H2" hooks from Kanebo BLT sized and disposed as described above and to be driven by that pad to abrade a workpiece. The force in shear available to move the sheets 10b relative to the pad in a direction parallel to the backing of the sheets after the loops were engaged with the hooks on the pad, and the force in peel required to peel the loops on the sheets 10b away from the hooks on the pad were measured in the manners described below. Those shear force values were in the range of about 700 to 1250 grams per lineal centimeter of engagement (4 to 7 pounds per lineal inch of engagement), and those peel force values were in the range of about 50 to 110 grams per lineal centimeter width of engagement (0.3 to 0.6 pounds per 1 inch width of engagement). The force in shear required to move the sheets 10b relative to the pad in a direction parallel to the backing of the sheets after the loops were engaged with the hooks on the pad was measured using a constant rate of extension tensilometer sold under the trade designation "Instron" which was set to have a crosshead speed of 1 inch per minute, a chart speed of 5 inches per minute, and a full scale load reading of 5000 grams. A strip was die cut from one of the sheets 10b that was 2 inches wide by 5 inches long, the length being taken in the machine direction or the direction the sheet 22 of fibers moved past the rollers 36 and 37. A strip of hooks 1 inch wide by 3 inches long was die cut from a sheet of hooks of the type used on the pads commercially available as the "Hookit" Disc Pad, part 051131-05776 with the edges of the strip aligned with the rows of hooks. A 2 inch long and 1 inch wide end portion of the strip of hooks was placed, without pressure, with its hooks against the loops on the strip cut from the sheet 10b with the lengths of the strips aligned and an end portion of the strip of hooks approximately 1 inch long and 1 inch wide projecting from one end of the strip of hooks. A 4.5 pound hand held rubber coated roller was then rolled longitudinally over those strips once in both directions at a rate of approximately 12 inches per minute to engage the hooks with the loops. The strip having the loops was secured in the bottom jaw of the extension tensilometer and the strip having the hooks was placed in its top jaw with the engaged hooks and loops therebetween, movement of the crosshead of the extension tensilometer was started to separate the engaged hooks and loops along the planes of their backings, and the maximum force in grams required to cause such separation was recorded. The force in peel required to peel the loops on the sheets 10b away from the hooks on the pad in a direction at 90 degrees to the backing of the pad after the loops were engaged with the hooks on the pad was also measured using the constant rate of extension tensilometer sold under the trade designation "Instron" which was set to have a crosshead speed of 20 inches per minute, a chart speed of 10 inches per minute, and a full scale load reading of 5 pounds. A strip was die cut from one of the sheets 10b that was 1 inch wide by 7 inches long, the length being taken in the machine direction or the direction the sheet of fibers 22 moved past the rollers 36 and 37. The strip was placed without applying pressure with its loops against the hooks on one of the 6 inch diameter pads commercially available as the "Hookit" Disc Pad, part 051131-05776, with the edges of the strip parallel to the rows of hooks on the pad, the strip extending diametrically of the pad, and one end of the strip aligned with the edge of the pad so that approximately 1 inch of the strip projected from the opposite edge of the pad. A 4.5 pound hand held rubber coated roller was then rolled longitudinally over the strip 3 times in both directions at a rate of approximately 1 inch per second to engage the loops with the hooks. The pad was secured to the upper portion of a degree peel jig by screwing the threaded stud on the pad by which the pad is normally attached to a drive motor into a threaded socket in the upper portion of the jig. The 90 degree peel jig had a lower portion that was fixed on the lower jaw of the extension tensilometer, and had bearings between its lower and upper portions that allowed free movement of the upper portion of the jig and thereby the pad in a direction oriented at 90 degrees to the direction of movement of the upper jaw of the extension tensilometer that was also parallel to the support surface of the pad from which the hooks project and parallel to the longitudinal edges of the strip having the loops to afford alignment of any portion of the strip having the loops engaged with the hooks on the pad with the upper jaw of the extension tensilometer. Movement of the crosshead of the extension tensilometer was started to separate the engaged loops from the hooks on the pad in a direction maintained by horizontal movement of the jig at 90 degrees to the surface of the pad, and the average highest forces in pounds per inch required to cause such separation was recorded.

EXAMPLE 2

The equipment and operating conditions described in Example 1 were used to adhere a sheet 22 of fibers of the type described in Example 1 to a layer 21 of polymeric (instead of paper) backing material using the same polypropylenes in the layer 20 of thermoplastic material that were used in Example 1. The layer 21 of polymeric backing material used was a polyester based film of the type referred to as microvoided film which had a specific gravity compared to water of about 1.23, was impregnated with about 10 percent by weight of polypropylene, and had a 0.0003 inch thick layer of polypropylene at its surface to facilitate bonding with the extruded polypropylene layer 20. The layer 21 of polymeric backing material was not coated with abrasive grains, but was of a type that could have been so coated. The resultant sheets were tested for shear and peel force values in the manner described in Example 1, and force values obtained from those tests were about in the same ranges determined in Example 1.

EXAMPLE 3

Equipment similar to that illustrated in FIGS. 12 in which the corrugating rollers 36 and 37 had the same dimensions and relationships specified in Example 1 were used to form a sheet of polymeric material 20 to which loops 16 were bonded. The sheet 22 of fibers fed between the corrugating members 36 and 37 was a blend of 85 percent by weight 15 denier, 4.763 centimeter (1.875 inch) long polyester fibers (type T295HC commercially available from Hoechst-Cellanese Corporation, Fiber Division, Charlotte, N.C.) and 15 percent by weight 4 denier, 4.763 centimeter (1.875 inch) long "melty" polyester fibers (type K54HC commercially available from Hoechst-Cellanese Corporation, Fiber Division, Charlotte, N.C.), which "melty" fibers had a polyester core having a melting temperature similar to that of the other polyester fibers (i.e., 350 degrees Fahrenheit) surrounded by a portion of sheath of polyester that softened at a significantly lower temperature (i.e., 250 degrees Fahrenheit) than the other polyester fibers. The Sheet 22 of fibers was formed on a "Rando-Webber" carding machine at a basis weight of 35 grams per square meter and thermally bonded along narrow bonding lines disposed in an ordered pattern and spaced at approximately 0.635 centimeter (0.25 inch) intervals so that the sheaths of the "melty" polyester fibers softened and bonded together the other polyester fibers causing the sheet 22 of fibers to have enough internal strength to remain intact as it was fed between the corrugating rollers 36 and 37. The corrugating roller 36 was heated by oil at about 165 degrees Centigrade (325 degrees Fahrenheit), and the pressing roller 41 was heated by oil at about 210 degrees Centigrade (410 degrees Fahrenheit), it being estimated that their surface temperatures were 5 to 10 Centigrade degrees (10 to 20 Fahrenheit degrees) cooler than the oil that heated them. The layer 20 of polymeric bonding material extruded in molten form from the die 29 was the polyester commercially available from DuPont, Wilmington, Del., under the trade designation "Selar" PT-X2.06. The temperature of the die 29 was about 280 degrees Centigrade (535 degrees Fahrenheit), and the layer 20 formed was about 0.0089 centimeter (0.0035 inch) thick. Six inch (15 centimeter) diameter pressure sensitive adhesive coated abrasive discs having a film backing and carrying grade 80 abrasive (i.e., the abrasive discs sold under the trade designation "Production", "Resin Bond", "Fre-Cut" Film, Open Coat by Minnesota Mining and Manufacturing Company, St. Paul, Minn.) were then adhered to the surface of the solidified layer 20 of polymeric bonding material resultant structure opposite its loops 16 by the layer of pressure sensitive adhesive on the discs to make a sheet of coated abrasive material 10c having the structure illustrated in FIG. 13. The resultant structure was found to adhere well to the pad commercially available as "Siafast" Blue from SIA Swiss Industrial Abrasives Ltd., Frauenfeld, Switzerland, which has a support surface covered by the "Kletto" brand hooks sized and disposed as described above and to be driven by that pad to abrade a workpiece.

EXAMPLE 4

Equipment similar to that illustrated in FIG. 12 in which the corrugating rollers 36 and 37 had the same dimensions and relationships specified in Example 1 were used to form a sheet of polymeric material 20 to which loops 16 were bonded. The sheet 22 of fibers fed between the corrugating members 36 and 37 was formed of 15 denier, 4.763 centimeter (1.875 inch) long polypropylene fibers (type T-182, commercially available from Hercules Corporation, Covington, Ga.) formed on a carding machine at a basis weight of 35 grams per square meter and thermally bonded along narrow bonding lines disposed in an ordered pattern and spaced at approximately 0.318 centimeter (0.125 inch) intervals so that the sheet 22 of fibers had enough internal strength to remain intact as it was fed between the corrugating rollers 36 and 37. The corrugating roller 36 was heated by oil at about 155 degrees Centigrade (310 degrees Fahrenheit), and the pressing roller 41 was heated by oil at about 200 degrees Centigrade (400 degrees Fahrenheit), it being estimated that their surface temperatures were 5 to 10 Centigrade degrees (10 to 20 Fahrenheit degrees) cooler than the oil that heated them. The layer 20 of polymeric bonding material extruded in molten form from the die 29 was the polypropylene commercially available from Shell Chemical Company, Houston, Tex., under the trade designation DS7C50. The temperature of the die 29 was about 196 degrees Centigrade (385 degrees Fahrenheit), and the layer 20 formed was about 0.005 centimeter (0.002 inch) thick. Six inch (15 centimeter) diameter pressure sensitive adhesive coated abrasive discs having a film backing and carrying grade 80 abrasive (i.e., the abrasive discs sold under the trade designation "Production" "Resin Bond" "Fre-Cut" Film, Open Coat by Minnesota Mining and Manufacturing Company, St. Paul, Minn.) were then adhered to the surface of the solidified layer 20 of polymeric bonding material resultant structure opposite its loops 16 by the layer of pressure sensitive adhesive on the discs to make a sheet of coated abrasive material 10c having the structure illustrated in FIG. 13. The resultant structure was found to adhere well to the pad commercially available as the "Hookit" Disc Pad, part No. 051131-05776, from Minnesota Mining and Manufacturing Company, St. Paul, Minn., which has a support surface covered by the "Type 1H2" hooks from Kanebo BLT sized and disposed as described above and to be driven by that pad to abrade a workpiece. The resultant sheets were tested for shear and peel force values in the manner described in Example 1, and force values obtained from those tests were about in the same ranges determined in Example 1.

EXAMPLE 5

Equipment similar to that illustrated in FIGS. 12 in which the corrugating rollers 36 and 37 had the same dimensions and relationships specified in Example 1 was used to form a sheet of polymeric material 20 to which loops 16 of the same polypropylene fibers fed in the same manner as was described in Example 4 were bonded with the corrugating and pressing rollers heated to the same temperatures as was described in Example 4. The layer 20 of polymeric bonding material extruded in molten form from the die 29 was either a 50/50 blend of two similar ethylene vinyl acetates commercially available from DuPont Company, Wilmington, Del., under the trade designations "Elvax" 265 and "Elvax" 240, or a functionalized triblock polymer with polystyrene endblocks and an ethylene-butylene copolymer midblock commercially available from Shell Chemical Company, Houston, Texas, under the trade designation "Kraton" FG1901. The temperature of the die 29 was about 196 degrees Centigrade (385 degrees Fahrenheit), and the layer 20 formed was about 0.005 centimeter (0.002 inch) thick. Six inch (15 centimeter) diameter pressure sensitive adhesive coated abrasive discs having a film backing and carrying grade 80 abrasive (i.e., the abrasive discs sold under the trade designation "Production" "Resin Bond" "Fre-Cut" Film, Open Coat, by Minnesota Mining and Manufacturing Company, St. Paul, Minnesota) were then adhered to the surface of the solidified layer 20 of polymeric bonding material resultant structure opposite its loops 16 by the layer of pressure sensitive adhesive on the discs to make a sheet of coated abrasive material 10c having the structure illustrated in FIG. 13. The resultant structure was found to adhere well to the pad commercially available as the "Hookit" Disc Pad, part No. 051131-05776, from Minnesota Mining and Manufacturing Company, St. Paul, Minn., which has a support surface covered by the "Type 1H2" hooks from Kanebo BLT sized and disposed as described above and to be driven by that pad to abrade a workpiece.

EXAMPLE 6

Equipment similar to that illustrated in FIGS. 10 and 11 in which the corrugating rollers 36 and 37 had the same dimensions and relationships specified in Example 1 was used to adhere loops 16 formed of the same polypropylene fibers fed in the same manner as described with reference to Example 4. The layer 20 of polymeric bonding material extruded in molten form from the die 29 was an adhesive resin based either on ethylene vinyl acetate or on a blend of polypropylene and styrene-butadiene block polymer commercially available from Minnesota Mining and Manufacturing Company, St. Paul, Minn., under the trade designation "Jet Melt" 3738TC or "Jet Melt" 3748TC. The layer 21 of polymeric backing material used was a polyester based film impregnated with about 10 percent by weight of polypropylene, with a specific gravity of 1.23 compared to water and was of the type referred to as microvoided film. The layer 21 of polymeric backing material was not coated with abrasive grains, but was of a type that could have been so coated.

EXAMPLE 7

Equipment similar to that illustrated in FIG. 8 was used to form an example of the sheet of abrasive coated material 10 illustrated in FIGS. 1 through 3. The ridges 28 on the first and second corrugating rollers 26 and 27 were disposed parallel to the axis of those rollers 26 and 27, had circumferential widths at their distal ends of about 0.42 centimeter (0.167 inch), tapered from their tips towards the axis of the roller 26 or 27 to which they are fixed at an angle of about 20 degrees, and were spaced circumferentially of the roller 26 or 27 on which they were fixed at about 0.211 centimeter (0.083 inch). The ridges 38 on the corrugating rollers 26 and 27 were shaped to provide clearances of about 0.01 centimeter (0.004 inch) between their surfaces, and the ridges 28 on the second corrugating roller 26 projected about 0.38 centimeter (0.15 inch) into the spaces between the ridges 28 on the first corrugating roller 26. The sheet 22 of fibers fed between the corrugating members 26 and 27 was formed of 9 denier, 4.763 centimeter (1.875 inch) long polypropylene fibers (type T0107, commercially available from Hercules Corporation, Covington, Ga.) formed on a carding machine at a basis weight of 25 grams per square meter and was thermally bonded along narrow bonding lines disposed in a diamond pattern and spaced at 0.635 centimeter (0.25 inch) intervals so that the sheet 22 of fibers had enough internal strength to remain intact as it was fed between the corrugating rollers 26 and 27. The corrugating rollers 26 and 27 were heated by oil at about 130 degrees Centigrade (270 degrees Fahrenheit), it being estimated that their surface temperatures were 5 to 10 Centigrade degrees (10 to 20 Fahrenheit degrees) cooler than the oil that heated them. The layer 20 of polymeric bonding material extruded in molten form from the die 29 was polypropylene commercially available from Shell Chemical Company, Houston, Tex., under the trade designation DS7C50. The die temperature was about 274 degrees Centigrade (525 degrees Fahrenheit), and the layer 20 formed was about 0.006 centimeter (0.0025 inch) thick. The layer 21 of backing material was 27 kilogram (60 pound) Fourdrinier Base paper coated with 24 grams per square meter (15 pounds per 3000 square feet) of polypropylene commercially available from Thilmany Pulp and Paper, Kaukauna, Wis. The paper layer 20 had a normal coating of grade 80 abrasive grains 14 adhered by a resin layer 24 to its surface opposite its coating of polypropylene in a conventional manner prior to having the layer 22 of fibers adhered to its polypropylene coated surface, and the cooling roller 30 and the support roll 40 were rubber coated to facilitate that abrasive coating. Sheets 10b of the resultant abrasive coated material were found to adhere well to the pad commercially available as the "Hookit" Disc Pad, part No. 051131-05776, from Minnesota Mining and Manufacturing Company, St. Paul, Minn., which has a support surface covered by the "Type 1H2" hooks from Kanebo BLT sized and disposed as described above and to be driven by that pad to abrade a workpiece. The force in shear required to move the sheets 10b relative to the pad in a direction parallel to the backing of the sheets after the loops were engaged with the hooks on the pad, and the force in peel required to peel the loops on the sheets 10b away from the hooks on the pad were measured in the manner described in Example 1, and force values obtained from those tests were about in the same ranges determined in Example 1.

EXAMPLE 8

Equipment similar to that illustrated in FIGS. 10 and 11 was used to form an example of the sheet of abrasive coated material 10b illustrated in FIG. 5. The ridges 38 on the first corrugating roller 36 had an axial width at their distal ends of about 0.42 centimeter (0.167 inch), tapered towards the axis of the roller 36 at an angle of about 10 degrees, and were spaced axially of the roller 36 at about 0.254 centimeter (0.1 inch). The ridges 38 on the corrugating rollers 36 and 37 were shaped to provide clearances of about 0.01 centimeter (0.004 inch) between their surfaces, and the ridges 38 on the second corrugating roller 36 projected about 0.203 centimeter (0.08 inch) into the spaces between the ridges 38 on the first corrugating roller 36. The ridges 42 on the pressing member 41 were disposed parallel to its axis, had a circumferential width at their distal ends of about 0.64 centimeter (0.25 inch), tapered towards the axis of the roller 36 at an angle of about 20 degrees, and were spaced circumferentially of the roller 36 at about 0.38 centimeter (0.15 inch). The sheet 22 of fibers fed between the corrugating members 36 and 37 was formed of a blend of 85 percent by weight 15 denier, 4.763 centimeter (1.875 inch) long polyester fibers and 15 percent by weight 4 denier, 4.763 centimeters (1.875 inch) long "melty" polyester fibers formed on a "Rando-Webber" carding machine at a basis weight of 30 grams per square meter and was thermally bonded along narrow bonding lines disposed in an ordered pattern and spaced at 0.635 centimeter (0.25 inch) intervals so that the sheet 22 of fibers had enough internal strength to remain intact as it was fed between the corrugating rollers 36 and 37. The corrugating roller 36 was heated by oil at about 160 degrees Centigrade (320 degrees Fahrenheit), and the pressing roller 41 was heated by oil at about 204 degrees Centigrade (400 degrees Fahrenheit), it being estimated that their surface temperatures were 5 to 10 Centigrade degrees (10 to 20 Fahrenheit degrees) cooler than the oil that heated them. The layer 20 of polymeric bonding material extruded in molten form from the die 29 was the moisture curable hot melt urethane commercially available from National Starch Company, Bridgewater, N.J., under the trade designation Bondmaster 70-7141. The die temperature was about 165 degrees Centigrade (325 degrees Fahrenheit), and the urethane material was fed to the die by a conventional hot melt pail unloader system. The layer 20 formed was about 0.008 centimeter (0.003 inch) thick. The layer 21 of backing material was 65 gram per meter Fourdrinier Base paper commercially available from The James River Corporation, Richmond, Va. The paper layer 20 had a normal coating of grade 180 abrasive grains 14 adhered by a resin layer 24 to one of its surfaces in a conventional manner prior to having the layer 22 of fibers adhered to its opposite surface, and the cooling roller 30 and the support roll 40 were rubber coated to facilitate that abrasive coating. Sheets 10b of the resultant abrasive coated material were found to adhere well to the pad commercially available as the "Hookit" Disc Pad, part 051131-05776, from Minnesota Mining and Manufacturing Company, St. Paul, Minn., which has a support surface covered by the "Type 1H2" hooks from Kanebo BLT sized and disposed as described above and to be driven by that pad to abrade a workpiece.

EXAMPLE 9

Equipment similar to that illustrated in FIG. 14 was used to form an example of the sheet of abrasive coated material 10 illustrated in FIGS. 1, 2 and 3. The ridges 58 on the first and second corrugating rollers 56 and 57 were disposed parallel to the axes of those rollers, had a circumferential width at their distal ends of about 0.51 centimeter (0.20 inch), tapered from their tips towards the axis of the roller 56 or 57 at angles of about 20 degrees, and were spaced circumferentially of the rollers 56 or 57 at about 0.64 centimeter (0.25 inch). The ridges 58 on the corrugating rollers 56 and 57 were shaped to provide clearances of about 0.01 centimeter (0.004 inch) between their surfaces, and the ridges 58 on the second corrugating roller 56 projected about 0.381 centimeter (0.15 inch) into the spaces between the ridges 58 on the first corrugating roller 56. The sheet 22 of fibers fed between the corrugating members 56 and 57 was formed of a blend of 85 parts by weight of 15 denier polyester fibers (Type T295HC commercially available from Hercules, Covington, Ga.), and 15 parts of 4 denier polyester melt fibers (type K54HC commercially available from Hercules, Covington, Ga.). Those fibers were formed into a dry laid nonwoven having a basis weight of 30 grams per square meter on a "Rando-Webber" carding machine, and that nonwoven was heat calendered at 300 degrees Fahrenheit to loosely bond the fibers together due to softening of the polyester melt fibers so that the sheet 22 of fibers had enough internal strength to remain intact as it was fed between the corrugating rollers 56 and 57. The corrugating rollers were heated by oil at about 280 degrees Fahrenheit, it being estimated that their surface temperatures were 10 to 20 degrees cooler than the oil that heated them. The layer 20 of polymeric bonding material coated in molten form from the die 59 was the moisture curable hot melt urethane commercially available from National Starch Company, Bridgewater, N.J., under the trade designation Bondmaster 70-7141, the die temperature was 325 degrees Fahrenheit, the polymeric bonding material was fed to the die from a conventional hot melt pail unloader system, and the layer 20 formed was about 0.0051 centimeter (0.002 inch) thick. The layer 21 of backing material was 40 pound Fourdrinier base paper commercially available from James River Corporation, Richmond, Va., The paper layer 21 had a normal coating of grade 180 abrasive grains 14 adhered in a conventional manner by a resin layer 24 to its surface opposite that to which the layer 22 of fibers was adhered prior to having the layer 22 of fibers adhered thereto. Sheets 10 of the resultant abrasive coated material were found to adhere well to the pad commercially available as the "Hookit" Disc Pad, part No. 051131-05776, from Minnesota Mining and Manufacturing Company, St. Paul, Minn., which has a support surface covered by the "Type 1H2" hooks from Kanebo BLT sized and disposed as described above and to be driven by that pad to abrade a workpiece.

The structure and method according to the present invention have now been described with reference to numerous embodiments thereof. It will be apparent to those skilled in the art that many changes can be made in the embodiments described without departing from the scope of the present invention. Also, the various embodiments of the loop fastener portions incorporated in the sheets of coated abrasive material described herein may have advantages when used in combination with hook fastener portions on structures other than sheets of coated abrasive material, such as on disposable diapers. Thus the scope of the present invention should not be limited to the structures described in this application, but only by structures described by the language of the claims and the equivalents of those structures.

We claim:

1. A method for forming a coated abrasive material comprising a backing having front and rear surfaces, a layer of abrasive grains adhered to said front surface by a layer of bonding resin and a multiplicity of loops projecting from said rear surface, a sheet of which coated abrasive material can be releasably attached to a pad having a support surface and a multiplicity of hooks projecting for the support surface by releasable engagement between the loops and the hooks while the sheet of coated abrasive material is driven by the pad to abrade a workpiece, said method comprising:

providing a sheet of fibers;
corrugating the sheet of fibers to have arcuate portions projecting in the same direction from spaced anchor portions of the sheet of fibers;
forming a layer of liquid polymeric bonding material;
immersing the anchor portions of the sheet of fibers in the layer of liquid polymeric bonding material;
solidifying the layer of liquid polymeric bonding material to form at least a portion of the backing around the spaced anchor portions of the sheet of fibers with the arcuate portions of the sheet of fibers projecting from the rear surface of the backing; and
adhering a layer of abrasive grains to a front surface of the backing with a layer of bonding resin; and
said corrugating step comprising the steps of:
providing first and second generally cylindrical corrugating members each having an axis and including a plurality of spaced ridges defining the periphery of the corrugating member, the ridges having outer surfaces and defining spaces between said ridges adapted to receive portions of the ridges of the other corrugating member in meshing relationship with the sheet of fibers therebetween; mounting the corrugating members in axially parallel relationship with portions of the ridges in meshing relationship;
rotating at least one of the corrugating members; and
feeding the sheet of fibers between the meshed portions of the ridges to generally conform the sheet of fibers to the periphery of the first corrugating member and form the arcuate portions of the fibers in the spaces between the ridges of the first corrugating member and the anchor portions of the sheet of fibers along the outer surfaces of the ridges of the first corrugating member.

2. A method for forming a coated abrasive material according to claim 1 wherein said steps of providing, corrugating, forming, immersing and solidifying are done prior to said adhering step.

3. A method for forming a coated abrasive material according to claim 1 wherein said steps of forming a layer of liquid polymeric bonding material comprises extruding said polymeric bonding material, and said step of solidifying the layer of liquid polymeric bonding material comprises the step of cooling the layer of liquid polymeric bonding material.

4. A method for forming a coated abrasive material according to claim 1 wherein said forming, immersing and solidifying steps from the entire backing.

5. A method for forming a coated abrasive material according to claim 1 wherein the fibers are made from the same material as the polymeric bonding material, and said forming, immersing and solidifying steps fuse the extruded polymeric bonding material to the surface of the fibers.

6. A method for forming a coated abrasive material according to claim 1 further including the steps of providing a sheet of backing material having a major surface, and positioning said major surface of the sheet of backing material closely adjacent the spaced anchor portions, and wherein in said forming step the liquid polymeric bonding material is deposited either onto the anchor portions of the fibers, onto the major surface of the sheet of backing material, or onto both the anchor portions of the fibers and the major surface of the sheet of backing material, and said method includes the step of positioning the major surface of the sheet of backing material and the anchor portions of the fibers close together with the liquid polymeric bonding material therebetween to provide said immersing step and so that after said solidifying step the polymeric bonding material adheres the anchor portions of the fibers to the sheet of backing material.

7. A method for forming a coated abrasive material comprising a backing having front and rear surfaces, a layer of abrasive grains adhered to said front surface by a layer of bonding resin and a multiplicity of loops projecting from said rear surface, a sheet of which coated abrasive material can be releasably attached to a pad having a support surface and a multiplicity of hooks projecting from the support surface by releasable engagement between the loops and the hooks while the sheet of coated abrasive material is driven by the pad to abrade a workpiece, said method comprising:
   providing a sheet of fibers;
   corrugating the sheet of fibers to have arcuate portions projecting in the same direction from spaced anchor portions of the sheet of fibers;
   forming a layer of liquid polymeric bonding material;
   immersing the anchor portions of the sheet of fibers in the layer of liquid polymeric bonding material;
   solidifying the layer of liquid polymeric bonding material to form at least a portion of the backing around the spaced anchor portions of the sheet of fibers with the arcuate portions of the sheet of fibers projecting from the rear surface of the backing; and
   adhering a layer of abrasive grains to a front surface of the backing with a layer of bonding resin;
   said method further including the steps of:
      providing a sheet of backing material having a major surface; and
      positioning said major surface of the sheet of backing material closely adjacent the spaced anchor portions; and
   in said forming step of the liquid polymeric bonding material is deposited either onto the anchor portions of the fibers, onto the major surface of the sheet of backing material, or onto both the anchor portions of the fibers and the major surface of the sheet of backing material, and said method includes the step of positioning the major surface of the sheet of backing material and the anchor portions of the fibers close together with the liquid polymeric bonding material therebetween to provide said immersing step and so that after said solidifying step the polymeric bonding material adheres the anchor portions of the fibers to the sheet of backing material
   said sheet of backing material is of paper and has a layer of polyethylene along said major surface, said liquid polymeric bonding material is polyethylene, said step of forming a layer of liquid polymeric bonding material comprises extruding said polyethylene, said step of positioning the major surface of the sheet of backing material and the anchor portions of the fibers close together with the liquid polymeric bonding material therebetween to provide said immersing step positions the polyethylene coating on the paper adjacent the anchor portions of the fibers so that the extruded liquid polyethylene softens and fuses to or mixes with the polyethylene coating on the paper, and said step of solidifying the layer of liquid polymeric bonding material comprises the step of cooling the layer of liquid polyethylene bonding material so that after said solidifying step the polyethylene bonding material firmly adheres the anchor portions of the fibers to the sheet of paper backing material.

8. A method for forming a coated abrasive material according to claim 7 wherein said step of adhering the layer of abrasive grains on one surface of the backing is completed prior to said steps of providing, corrugating, forming, immersing and solidifying.

9. A method for forming a coated abrasive material according to claim 7 wherein said step of adhering the layer of abrasive grains on one surface of the backing is completed after said steps of providing, corrugating forming, immersing and solidifying.

10. A method for forming a coated abrasive material comprising a backing having front and rear surfaces, a layer of abrasive grains adhered to said front surface by a layer of bonding resin and a multiplicity of loops projecting from said rear surface, a sheet of which coated abrasive material can be releasably attached to a pad having a support surface and a multiplicity of hooks projecting form the support surface by releasable engagement between the loops and the hooks while the sheet of coated abrasive material is driven by the pad to abrade a workpiece, said method comprising:
   providing a sheet of fibers;
   corrugating the sheet of fibers to have arcuate portions projecting in the same direction from spaced anchor portions of the sheet of fibers;
   forming a layer of liquid polymeric bonding material;
   immersing the anchor portions of the sheet of fibers in the layer of liquid polymeric bonding material;
   solidifying the layer of liquid polymeric bonding material to form at least a portion of the backing around the spaced anchor portions of the sheet of fibers with the arcuate portions of the sheet of fibers projecting from the rear surface of the backing; and
   adhering a layer of abrasive grains to a front surface of the backing with a layer of bonding resin; and
   the sheet of fibers provided in said providing step has a plurality of the fibers extending in a first direction along the sheet, and said forming step forms the sheet of fibers so that the anchor portions of the sheet of fibers are parallel and elongate in a second direction along the sheet of fibers that is generally at a right angle to the first direction in which the plurality of the fibers extend along the sheet.

11. A method for forming a coated abrasive material comprising a backing having front and rear surfaces, a layer of abrasive grains adhered to said front surface by a layer of bonding resin and a multiplicity of loops projecting from said rear surface, a sheet of which coated abrasive material can be releasably attached to a pad having a support surface and a multiplicity of hooks projecting from the support surface by releasable engagement between the loops and the hooks while the sheet of coated abrasive material is driven by the pad to abrade a workpiece, said method comprising:
   providing a sheet of fibers;
   corrugating the sheet of fibers to have arcuate portions projecting in the same direction from spaced anchor portions of the sheet of fibers;
   forming a layer of liquid polymeric bonding material;
   immersing the anchor portions of the sheet of fibers in the layer of liquid polymeric bonding material;
   solidifying the layer of liquid polymeric bonding material to form at least a portion of the backing around the spaced anchor portions of the sheet of fibers with the arcuate portions of the sheet of fibers projecting from the rear surface of the backing; and adhering a layer of abrasive grains to a front surface of the backing with a layer of bonding resin; and the sheet of fibers provided in said providing step is elongate; and said corrugating step comprises the steps of:
providing a corrugating member including a plurality of elongate, parallel, spaced ridges defining the periphery of the corrugating member, the ridges defining spaces between the ridges; and
feeding the sheet of fibers longitudinally along the ridges in a direction generally parallel to the ridges while generally conforming the sheet of fibers to the periphery of the corrugating member to form the arcuate portions of the fibers in the spaces between the ridges of the corrugating member and the anchor portions of the sheet of fibers along the ridges of the corrugating member.

12. A method for forming a coated abrasive material according to claim 18 wherein at least the majority of the fibers are aligned longitudinally in the sheet of fibers, said providing and feeding steps form a first set of elongate parallel anchor portions extending longitudinally of the sheet of fibers, which first set of anchor portions is immersed in the liquid polymeric bonding material in said immersing step, and said method further includes the subsequent step of forming a second set of anchor portions transverse to the first set of anchor portions and the first direction, embedding the second set of anchor portions in the polymeric bonding material prior to completion of said solidifying step to provide, after the solidifying step, bonding locations including first and second elongate, generally parallel portions disposed in a pattern to provide areas of said arcuate portions along said rear surface of said backing.

13. A method for forming a coated abrasive material comprising a backing having front and rear surfaces, a layer of abrasive grains adhered to said front surface by a layer of bonding resin and a multiplicity of loops projecting from said rear surface, a sheet of which coated abrasive material can b releasably attached to a pad having a support surface and a multiplicity of hooks projecting from the support surface by releasable engagement between the loops and the hooks while the sheet of coated abrasive material is driven by the pad to abrade a workpiece, said method comprising:
providing a sheet of fibers;
corrugating the sheet of fibers to have arcuate portions projecting in the same direction from spaced anchor portions of the sheet of fibers;
forming a layer of liquid polymeric bonding material;
immersing the anchor portions of the sheet of fibers in the layer of liquid polymeric bonding material;
solidifying the layer of liquid polymeric bonding material to form at least a portion of the backing around the spaced anchor portions of the sheet of fibers with the arcuate portions of the sheet of fibers projecting from the rear surface of the backing; and
adhering a layer of abrasive grains to a front surface of the backing with a layer of bonding resin;
said step of providing a sheet of fibers comprising the steps of:
providing a majority of polyester fibers having a first softening temperature, and a minority of fibers which comprise portions that soften at a significantly lower temperature than the polyester fibers; and thermally bonding the sheet of fibers at a temperature that will soften the portions of the minority of the fibers so that the portions of the minority of the fibers soften and bond together the polyester fibers causing the sheet of fibers to have enough internal strength to remain intact during said corrugating step.

14. A method for forming a coated abrasive material comprising a backing having front and rear surfaces, a layer of abrasive grains adhered to said front surface by a layer of bonding resin and a multiplicity of loops projecting from said rear surface, a sheet of which coated abrasive material can be releasably attached to a pad having a support surface and a multiplicity of hooks projecting from the support surface by releasable engagement between the loops and the hooks while the sheet of coated abrasive material is driven by the pad to abrade a workpiece, said method comprising:
providing a sheet of fibers;
corrugating the sheet of fibers to have arcuate portions projecting in the same direction from spaced anchor portions of the sheet of fibers;
forming a layer of liquid polymeric bonding material;
immersing the anchor portions of the sheet of fibers int he layer of liquid polymeric bonding material;
solidifying the layer of liquid polymeric bonding material to form a portion of the backing around the space anchor portions of the sheet of fibers with the arcuate portions of the sheet of fibers projecting from the rear surface of the portion of the backing;
providing a layer of backing material having a layer of abrasive grains adhered to one surface by a layer of bonding resin; and
adhering the surface of the portion of the backing opposite the sheet of fibers to the surface of the layer of backing material opposite the layer of abrasive grains; and
said corrugating step comprises the steps of:
providing first and second generally cylindrical corrugating members each having an axis and including a plurality of spaced ridges defining the periphery of the corrugating member, the ridges having outer surfaces and defining spaces between said ridges adapted to receive portions of the ridges of the other corrugating member in meshing relationship with the sheet of fibers therebetween; mounting the corrugating members in axially parallel relationship with portions of the ridges in meshing relationship;
rotating at least one of the corrugating members; and
feeding the sheet of fibers between the meshed portions of the ridges to generally conform the sheet of fibers to the periphery of the first corrugating member and form the arcuate portions of the fibers in the spaces between the ridges of the first corrugating member and the anchor portions of the sheet of fibers along the outer surfaces of the ridges of the first corrugating member.

15. A method according to claim 14 wherein said adhering step includes the step of applying a layer of adhesive between the surface of the portion of the backing opposite the sheet of fibers and the surface of the layer of backing material opposite the layer of abrasive grains.

16. A method according to claim 14 wherein said adhering step includes the step of applying a layer of pressure sensitive adhesive to the surface of the layer of backing material opposite the layer of abrasive grains, and subsequently adhering the layer of pressure sensitive adhesive to the surface of the portion of the backing opposite the sheet of fibers.

17. A method according to claim 14 wherein said adhering step includes the step of positioning the surface of the layer of backing material opposite the layer of abrasive grains in contact with the layer of liquid polymeric bonding material during the immersing step so that said solidifying step adheres the surface of the portion of the backing opposite the sheet of fibers to the surface of the layer of backing material opposite the layer of abrasive grains.

18. A method for forming a coated abrasive material comprising a backing having front and rear surfaces, a layer of abrasive grains adhered to said front surface by a layer of bonding resin and a multiplicity of loops projecting from said rear surface, a sheet of which coated abrasive material can be releasably attached to a pad having a support surface and a multiplicity of hooks projecting from the support surface by releasable engagement between the loops and the hooks while the sheet of coated abrasive material is driven by the pad to abrade a workpiece, said method comprising:
  providing a sheet of fibers;
  corrugating the sheet of fibers to have arcuate portions projecting in the same direction from spaced anchor portions of the sheet of fibers;
  forming a layer of liquid polymeric bonding material;
  immersing the anchor portions of the sheet of fibers in the layer of liquid polymeric bonding material;
  solidifying the layer of liquid polymeric bonding material to form a portion of the backing around the spaced anchor portions of the sheet of fibers with the arcuate portions of the sheet of fibers projecting from the rear surface of the portion of the backing;
  providing a layer of backing material having a layer of abrasive grains adhered to one surface by a layer of bonding resin; and
  adhering the surface of the portion of the backing opposite the sheet of fibers to the surface of the layer of backing material opposite the layer of abrasive grains;
  the sheet of fibers provided by said providing step is elongate and
  said corrugating step comprises the steps of:
    providing a corrugating member including a plurality of elongate, parallel, spaced ridges defining the periphery of the corrugating member, the ridges defining spaces between the ridges; and
    feeding the sheet of fibers longitudinally along the ridges in a direction generally parallel to the ridges while generating conforming the sheet of fibers to the periphery of the corrugating member to form the arcuate portions of the fibers in the spaces between the ridges of the corrugating member and the anchor portions of the sheet of fibers along the ridges of the corrugating member.

19. A method for forming a coated abrasive material according to claim 18 wherein at least the majority of the fibers are aligned longitudinally in the sheet of fibers, said providing and feeding steps form a first set of elongate parallel anchor portions extending longitudinally of the sheet of fibers, which first set of anchor portions is immersed in the liquid polymeric bonding material in said immersing step, and said method further includes the subsequent step of forming a second set of anchor portions transverse to the first set of anchor portions and the first direction, embedding the second set of anchor portions int eh polymeric bonding material prior to completion of said solidifying step to provide, after the solidifying step, bonding locations including first and second elongate, generally parallel portions disposed in a pattern to provide areas of said arcuate portions along said rear surface of said backing.

20. A method for forming a loop fastener portion comprising a backing having front and rear surfaces, and a multiplicity of loops projecting from said rear surface adapted for releasable engagement with a plurality of hooks, said method comprising:
  providing an elongate sheet of fibers in which sheet of fibers the majority of the fibers are aligned longitudinally in the sheet of fibers;
  corrugating the sheet of fibers to have arcuate portions projecting in the same direction from spaced anchor portions of the sheet of fibers, said corrugating step comprising the steps of:
  providing a corrugating member including a plurality of elongate, parallel, spaced ridges defining the periphery of the corrugating member, the ridges defining spaces between the ridges; and
  feeding the sheet of fibers longitudinally along the ridges in a direction generally parallel to the ridges while generally conforming the sheet of fibers to the periphery of the corrugating member to form the arcuate portions of the fibers in the spaces between the ridges of the corrugating member and the anchor portions of the sheet of fibers along the ridges of the corrugating member to form a first set of elongate parallel anchor portions extending longitudinally of the sheet of fibers,;
  forming a layer of liquid polymeric bonding material;
  immersing the anchor portions of the first set of anchor portions on the sheet of fibers in the layer of liquid polymeric bonding material;
  solidifying the layer of liquid polymeric bonding material to form at least a portion of the backing around the spaced anchor portions of the sheet of fibers with the arcuate portions of the sheet of fibers projecting from the rear surface of the backing; said providing
  forming a second set of anchor portions transverse to the first set and to the first direction,
  embedding the second set of anchor portions in the polymeric bonding material prior to completion of said solidifying step to provide, after the solidifying step, bonding locations including first and second elongate, generally parallel portions disposed in a pattern to provide areas of said arcuate portions along said rear surface of said backing.

21. A method for forming a loop fastener portion according to claim 20 wherein said step of forming a layer of liquid polymeric bonding material comprises extruding said polymeric bonding material, and said step of solidifying the layer of liquid polymeric bonding material comprises the step of cooling the layer of liquid polymeric bonding material.

22. A method for forming a loop fastener portion according to claim 20 wherein said step of providing a sheet of fibers comprises the steps of providing a majority of polyester fibers having a first softening temperature, and a minority of fibers including portions which soften at a significantly lower temperature than the polyester fibers, and thermally bonding the sheet of fibers at a temperature that will soften the portions of the minority of the fibers so that the portions of the minority of the fibers soften and bond together the polyester fibers causing the sheet of fibers to have enough internal strength to remain intact during said corrugating step.

23. A method for forming a loop fastener portion according to claim 20 further including the step of providing a sheet of backing material having a major surface, and positioning said major surface of the sheet of backing material closely adjacent the spaced anchor portions, and wherein in said forming step the liquid polymeric bonding material is deposited either onto the anchor portions of the fibers, onto the major surface of the sheet of backing material, or onto both the anchor portions of the fibers and the major surface of the sheet of backing material, and said method includes the step of positioning the major surface of the sheet of backing material and the anchor portions of the fibers close together with the liquid polymeric bonding material therebetween to provide said immersing step and so that after said solidifying step the polymeric bonding material adheres the anchor portions of the fibers to the sheet of backing material.

24. A method for forming a loop fastener portion according to claim 23 wherein said sheet of backing material is of paper and has a layer of polyethylene along said major surface, said liquid polymeric bonding material is polyethylene, said step of forming a layer of liquid polymeric bonding material comprises extruding said polyethylene, said step of positioning the major surface of the sheet of backing material and the anchor portions of the fibers close together with the liquid polymeric bonding material therebetween to provide said immersing step positions the polyethylene coating on the paper adjacent the anchor portions of the fibers so that the extruded liquid polyethylene softens and fuses to or mixes with the polyethylene coating on the paper, and said step of solidifying the layer of liquid polymeric bonding material comprises the step of cooling the layer of liquid polyethylene bonding material so that after said solidifying step the polyethylene bonding material firmly adheres the anchor portions of the fibers to the sheet of paper backing material.

* * * * *